(12) United States Patent
Kodama et al.

(10) Patent No.: US 9,511,809 B2
(45) Date of Patent: Dec. 6, 2016

(54) HEIGHT ADJUSTABLE SEATPOST ASSEMBLY

(75) Inventors: Michihiro Kodama, Osaka (JP);
Nobukatsu Hara, Osaka (JP);
Toshikuni Suzuki, Osaka (JP)

(73) Assignee: Shimano Inc., Osaka (JP)

( * ) Notice: Subject to any disclaimer, the term of this patent is extended or adjusted under 35 U.S.C. 154(b) by 1735 days.

(21) Appl. No.: 12/710,563

(22) Filed: Feb. 23, 2010

(65) Prior Publication Data
US 2011/0204201 A1   Aug. 25, 2011

(51) Int. Cl.
*F16M 11/00* (2006.01)
*B62J 1/08* (2006.01)

(52) U.S. Cl.
CPC ...................... *B62J 1/08* (2013.01)

(58) Field of Classification Search
CPC ..................... B62J 1/08; G21C 1/32
USPC ............... 248/405, 407, 408, 414, 157, 161
See application file for complete search history.

(56) References Cited

U.S. PATENT DOCUMENTS

| 390,406 | A | * | 10/1888 | Sittig | 108/146 |
| 1,889,783 | A | * | 12/1932 | Harman | 108/95 |
| 3,064,934 | A | * | 11/1962 | Desmarais | 248/409 |
| 3,217,672 | A | * | 11/1965 | Haughey | 108/146 |
| 4,627,591 | A | * | 12/1986 | Heckmann | 248/411 |
| 5,031,869 | A | * | 7/1991 | Strater et al. | 248/406.1 |
| 5,586,830 | A | * | 12/1996 | Wanek et al. | 403/59 |
| 6,296,408 | B1 | * | 10/2001 | Larkin et al. | 400/682 |
| 6,354,557 | B1 | * | 3/2002 | Walsh | 248/600 |
| 7,083,180 | B2 | | 8/2006 | Turner | |
| 7,837,201 | B2 | * | 11/2010 | Cheng et al. | 280/5.2 |
| 8,056,489 | B2 | * | 11/2011 | Nielsen | 108/147.19 |

FOREIGN PATENT DOCUMENTS

| CN | 201032937 Y | 3/2008 |
| DE | 10 2007 063 365 A1 | 7/2009 |
| JP | 2003-165474 A | 6/2003 |
| JP | 2005-231567 A | 9/2005 |
| JP | 2005-262900 A | 9/2005 |
| JP | 2006-056285 A | 3/2006 |
| JP | 2006-123882 A | 5/2006 |
| WO | WO-2004/023937 A1 | 3/2004 |

* cited by examiner

*Primary Examiner* — Amy Sterling
(74) *Attorney, Agent, or Firm* — Global IP Counselors

(57) ABSTRACT

A height adjustable seatpost assembly is provided with first and second tubes, a ratchet mechanism and a drive source. The first and second tubes are telescopically arranged. The ratchet mechanism includes a ratchet tooth structure and a pawl structure. The pawl structure is engaged with the ratchet tooth structure in a lock position. The pawl structure is movably coupled with respect to the ratchet tooth structure in a movable position such that the first and second tubes are movably arranged relative to each other in at least one axial direction of the first and second tubes. The drive source moves the pawl structure between the lock position and the movable position in response to operation of the drive source. The drive source further axially moves the first and second tubes relative to each other in response to operation of the drive source.

17 Claims, 30 Drawing Sheets

HEIGHT ADJUSTABLE SEATPOST ASSEMBLY

BACKGROUND

Field of the Invention

This invention generally relates to a seatpost that is adjustable to change a seat height of a bicycle seat.

Background Information

A bicycle seat is normally supported on a bicycle frame by a seatpost that is telescopically disposed in the seat tube of the bicycle frame. The bicycle seat typically has a pair of parallel rails extending along the bottom of the seat. The rails of the bicycle seat are attached to the seatpost by a clamp at the top of the seatpost. The height of the bicycle seat with respect to the bicycle frame is typically adjusted by changing an insertion amount of the seatpost in the seat tube of the bicycle frame. The upper end of the seat tube is typically provided with a longitudinal slit and a clamping arrangement that adjusts the diameter of the upper end of the seat tube to squeeze the seatpost for securing the seatpost in the desired position with respect to the bicycle frame.

Recently, seatpost have been proposed that various adjustment mechanism in order to adjust the height of the seat. In some conventional mechanical bicycle seatpost adjustment mechanisms, a manual lever is provided for changing the seat height using a piston type telescopic tube arrangement such as disclosed in U.S. Pat. No. 7,083,180. Also motorized seatpost assemblies have been proposed for changing the seat height. Examples of motorized seatpost assemblies are disclosed in Japanese Laid-Open Patent Application No. 2005-231567 and Japanese Laid-Open Patent Application No. 2005-262900. In these motorized seatpost assemblies, when the rider sit down the seat, the force is transmitted to the height adjustment mechanism, which impart undesirable stresses on the height adjustment mechanism.

SUMMARY

One object of the present invention is to provide a height adjustable seatpost assembly that has a lockout mechanism that can support a rider's weight so that the rider's weight is not transmitted to a drive source of the height adjustment device once the height of the seat is set to a desired seat position.

The foregoing objects can basically be attained by providing a height adjustable seatpost assembly that comprises first and second tubes, a ratchet mechanism and a drive source. The first and second tubes are telescopically arranged. The ratchet mechanism includes a ratchet tooth structure and a pawl structure. The pawl structure is engaged with the ratchet tooth structure in a lock position. The pawl structure is movably coupled with respect to the ratchet tooth structure in a movable position such that the first and second tubes are movably arranged relative to each other in at least one axial direction of the first and second tubes. The drive source is operatively connected to the pawl structure to move the pawl structure between the lock position and the movable position in response to operation of the drive source. The drive source is further operatively connected between the first and second tubes to axially move the first and second tubes relative to each other in response to operation of the drive source.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
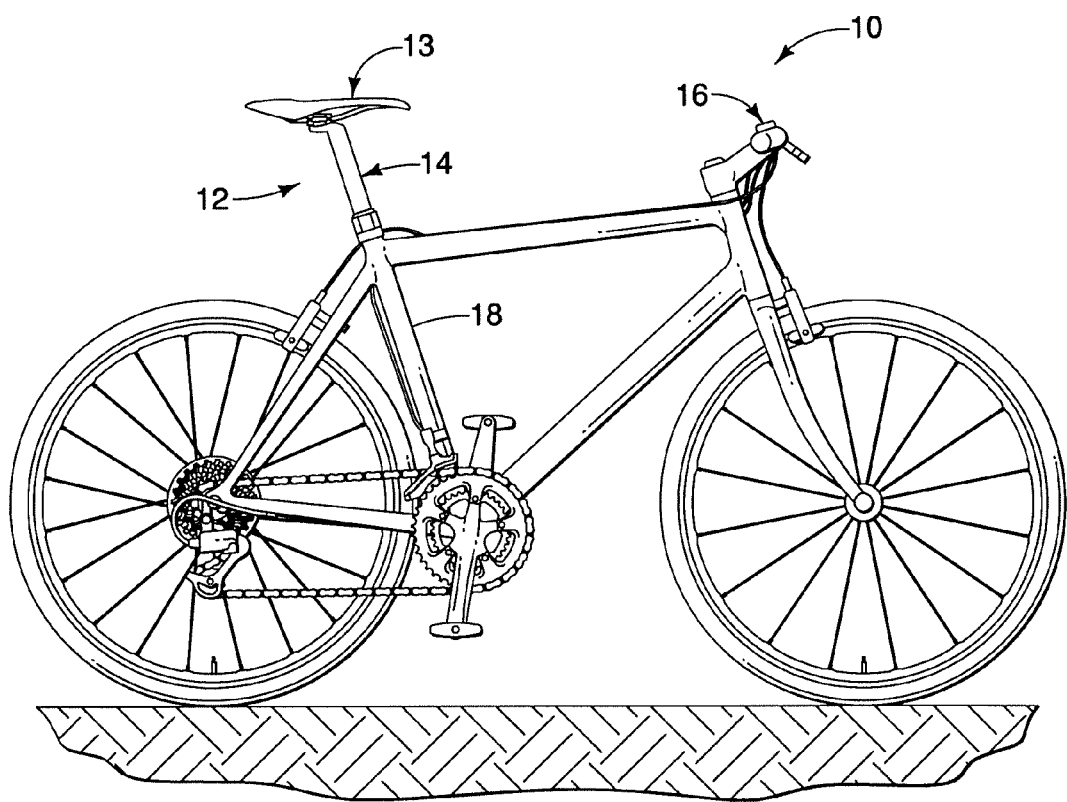
FIG. 1 is a side elevational view of a bicycle in which one embodiment of a height adjustable seatpost assembly is employed.
Figure 2:
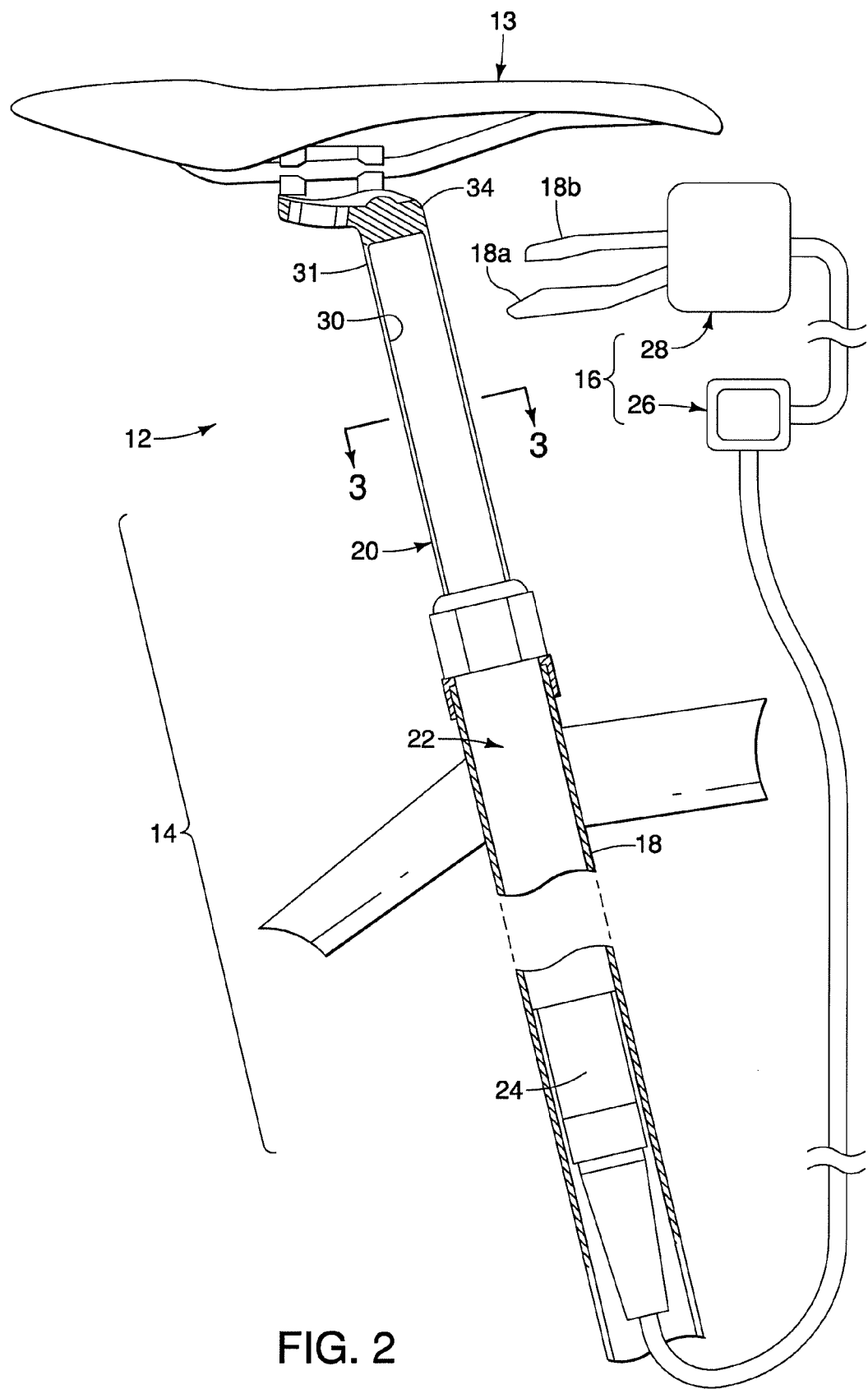
FIG. 2 is a partial side elevational view of the bicycle illustrated in FIG. 1 that is equipped with the height adjustable seatpost assembly.

Referring initially to FIGS. 1 and 2, a bicycle 10 is illustrated that is equipped with a height adjustable seatpost assembly 12 in accordance with one embodiment. The height adjustable seatpost assembly 12 is a motorized assembly for adjusting a seat height of a bicycle seat 13. The height adjustable seatpost assembly 12 includes a telescoping seatpost part 14 and a control part 16 for adjusting a seat height of a bicycle seat 13. The telescoping seatpost part 14 is mounted to a seat tube 18 of the bicycle 10, while the control part 16 is mounted to a handlebar of the bicycle 10. The seat tube 18 is a conventional portion of a bicycle frame that includes a clamping arrangement (not shown) for securing the height adjustable seatpost assembly 12 to the bicycle frame. The height adjustable seatpost assembly 12 adjusts a seat height of the bicycle seat 13 with respect to the seat tube 18. In this embodiment, the length of the telescoping seatpost part 14 is adjustable to four preset seatpost positions, e.g., a bottom preset seatpost position, a lower middle preset seatpost position, an upper middle preset seatpost position, and a top preset seatpost position. However, the height adjustable seatpost assembly 12 can have fewer or more seatpost positions as needed and/or desired.

As seen in FIG. 2, the telescoping seatpost part 14 mainly includes an inner (first) tube 20, an outer (second) tube 22 and a height adjustment device 24, while the control part 16 includes a controller 26 and a user operating switch or device 28. In general, the inner and outer tubes 20 and 22 are telescopically arranged, with the amount of insertion of the inner tube 20 into the outer tube 22 being adjustable. Thus, the inner and outer tubes 20 and 22 has a common longitudinal axis A in the illustrated embodiment as seen in FIG. 3.

In the illustrated embodiment, the inner and outer tubes 20 and 22 are a separate unit from the seat tube 18 such that the outer tube 22 is easily installed into the seat tube 18 as seen in FIG. 2. The outer tube 22 is secured to the seat tube 18 by a conventional clamping arrangement (not shown) provided on the upper end of the seat tube 18. In particular, the upper end of the seat tube 18 is provided with a longitudinal slit such that the clamping arrangement adjusts the diameter of the upper end of the seat tube to squeeze the outer tube 22. The height adjustment device 24 operatively connects the inner and outer tubes 20 and 22 together for selectively extending (raising) and retracting (lowering) the inner tube 20 with respect to the outer tube 22 based on a motor control signal from the operating switch 28 via the controller 26.

Figure 3:
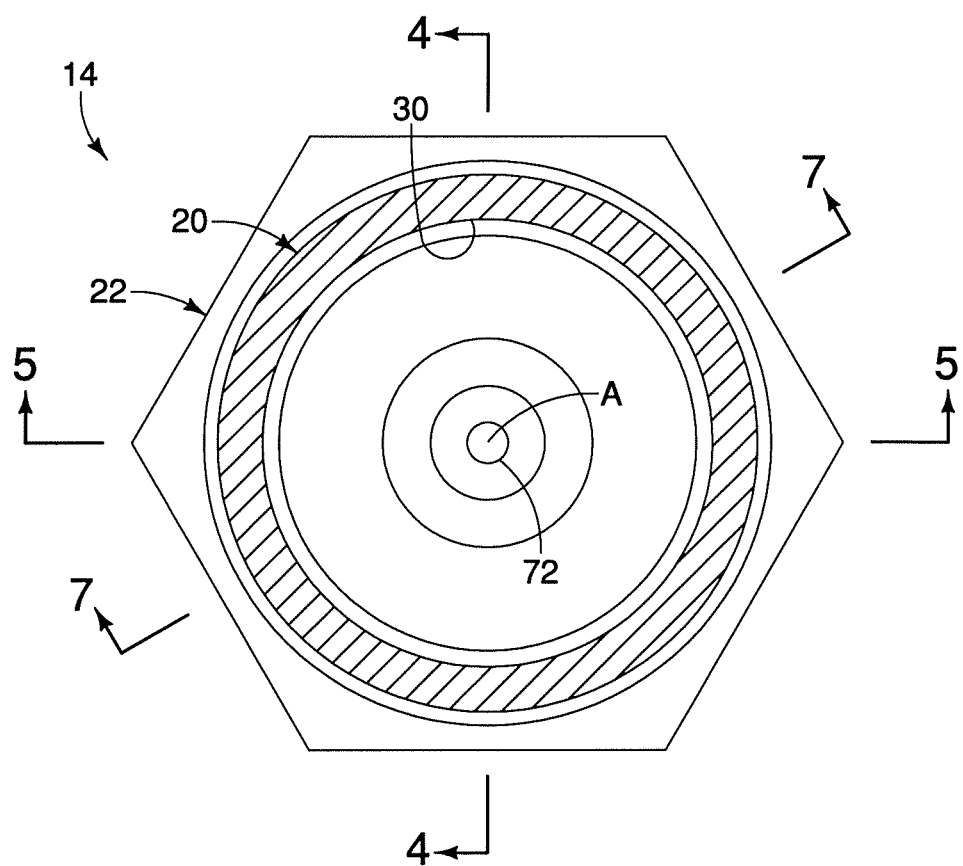
FIG. 3 is an enlarged transverse cross sectional view of a portion of the telescoping seatpost part as seen along section line 3-3 of FIG. 2.
Figure 4:
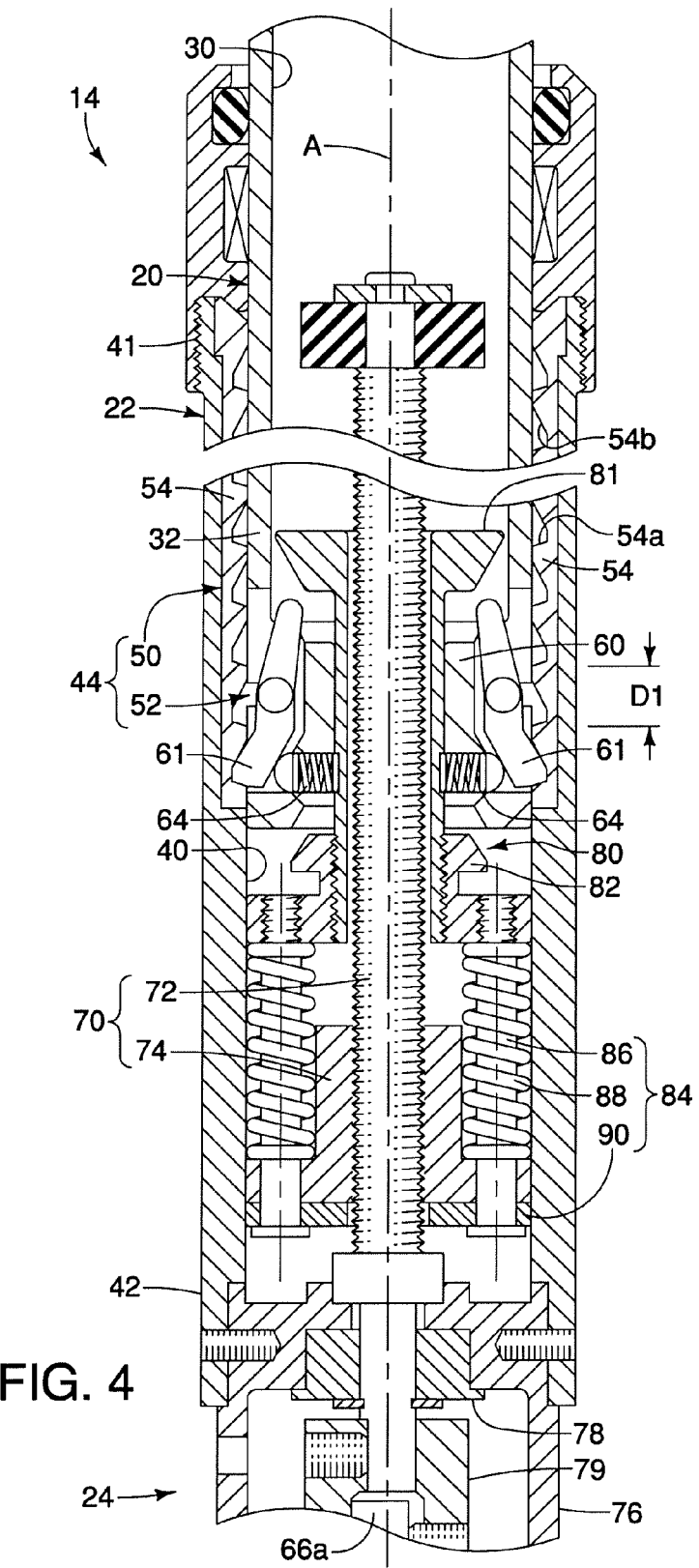
FIG. 4 is an enlarged longitudinal cross sectional view of a portion of the telescoping seatpost part as seen along section line 4-4 of FIG. 3.

As seen in FIGS. 2 to 4, the inner tube 20 has an interior bore 30, a first end 31 (FIG. 2) and a second end 32 (FIG. 4). The first end 31 of the inner tube 20 includes a seat mounting member 34 (FIG. 2) that secures the bicycle seat 13 thereto. The second end 32 of the inner tube 20 is open with the interior bore 30 of the inner tube 20 extending longitudinally from the opening of the second end 32 of the inner tube 20 to the first end 31 of the inner tube 20. As seen in FIG. 4, the second end 32 of the inner tube 20 has a portion of the height adjustment device 24 fixedly secured thereto as discussed below.

Figure 5:
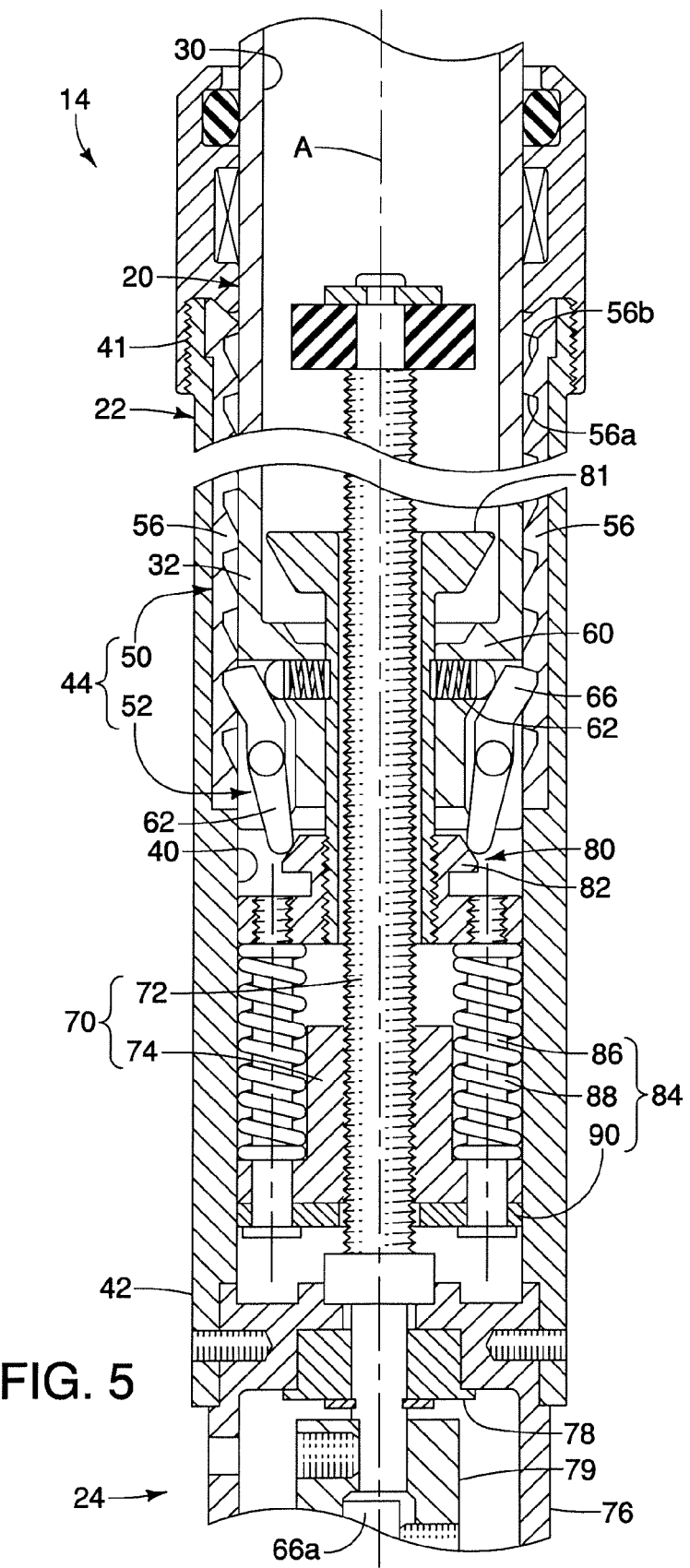
FIG. 5 is an enlarged longitudinal cross sectional view of a portion of the telescoping seatpost part as seen along section line 5-5 of FIG. 3.

As seen in FIGS. 4 and 5, the outer tube 22 has an interior bore 40, a first end 41 and a second end 42. The first and second ends 41 and 42 of the outer tube 22 are open with the interior bore 40 of the outer tube 22 extends longitudinally between the first and second ends 41 and 42 of the outer tube 22. The second end 32 of the inner tube 20 is telescopically disposed in the first end 41 of the outer tube 22. The second end 42 of the outer tube 22 has a portion of the height adjustment device 24 fixedly secured thereto as discussed below.

Figure 6:
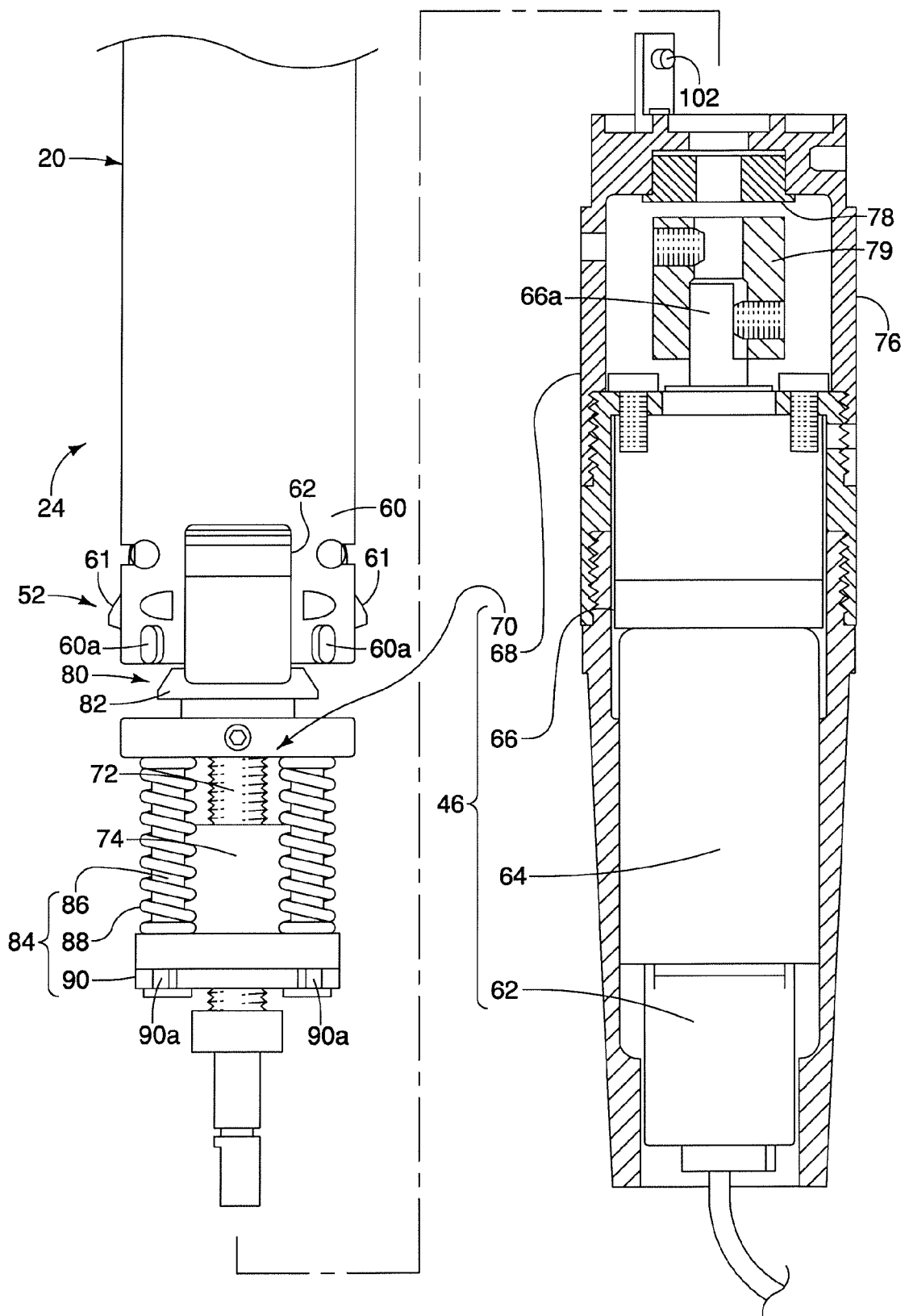
FIG. 6 is an exploded elevational view of selected parts of the telescoping seatpost part of the height adjustable seatpost assembly.
Figure 7:
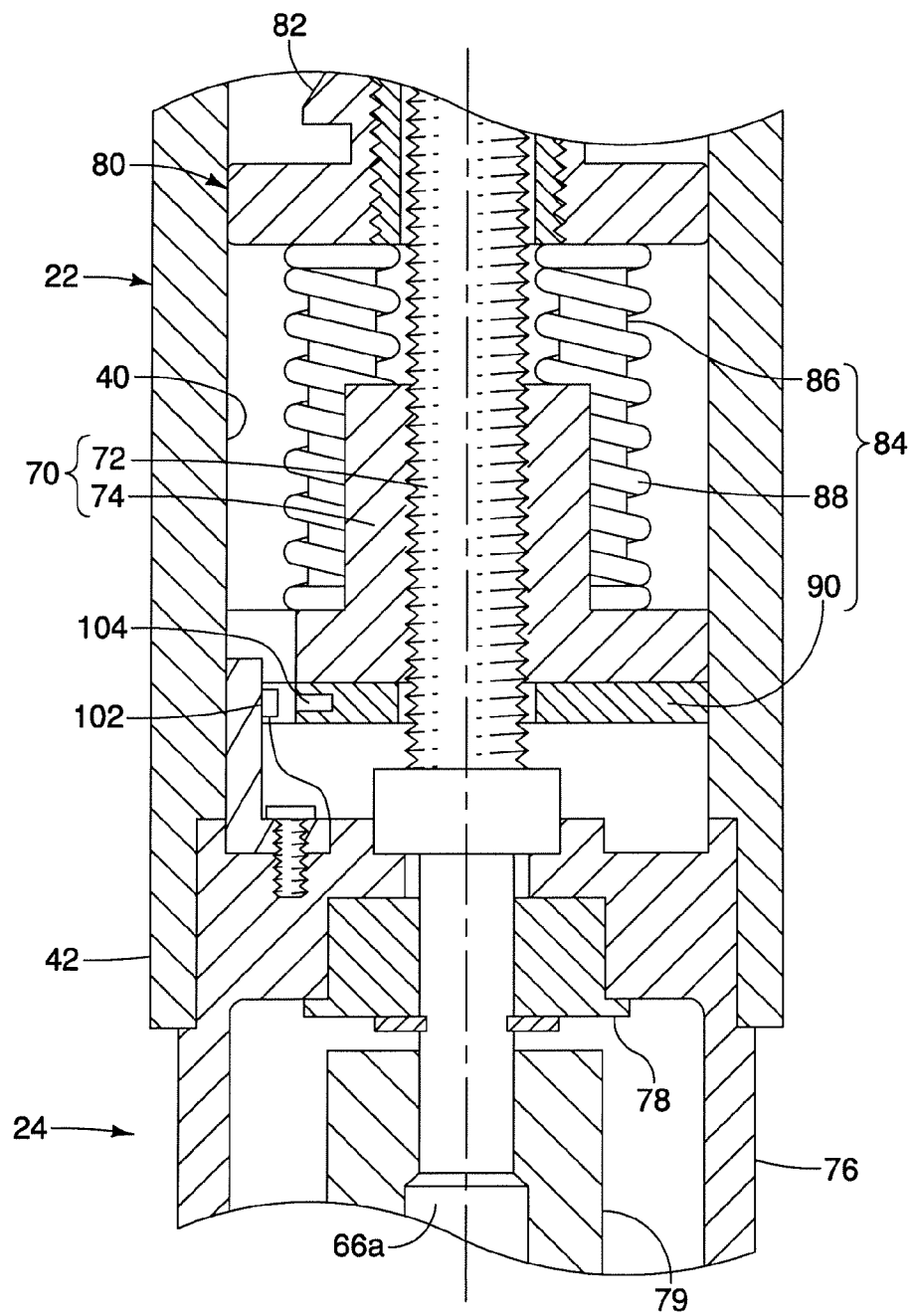
FIG. 7 is an enlarged longitudinal cross sectional view of a portion of the telescoping seatpost part as seen along section line 7-7 of FIG. 3.
Figure 8:
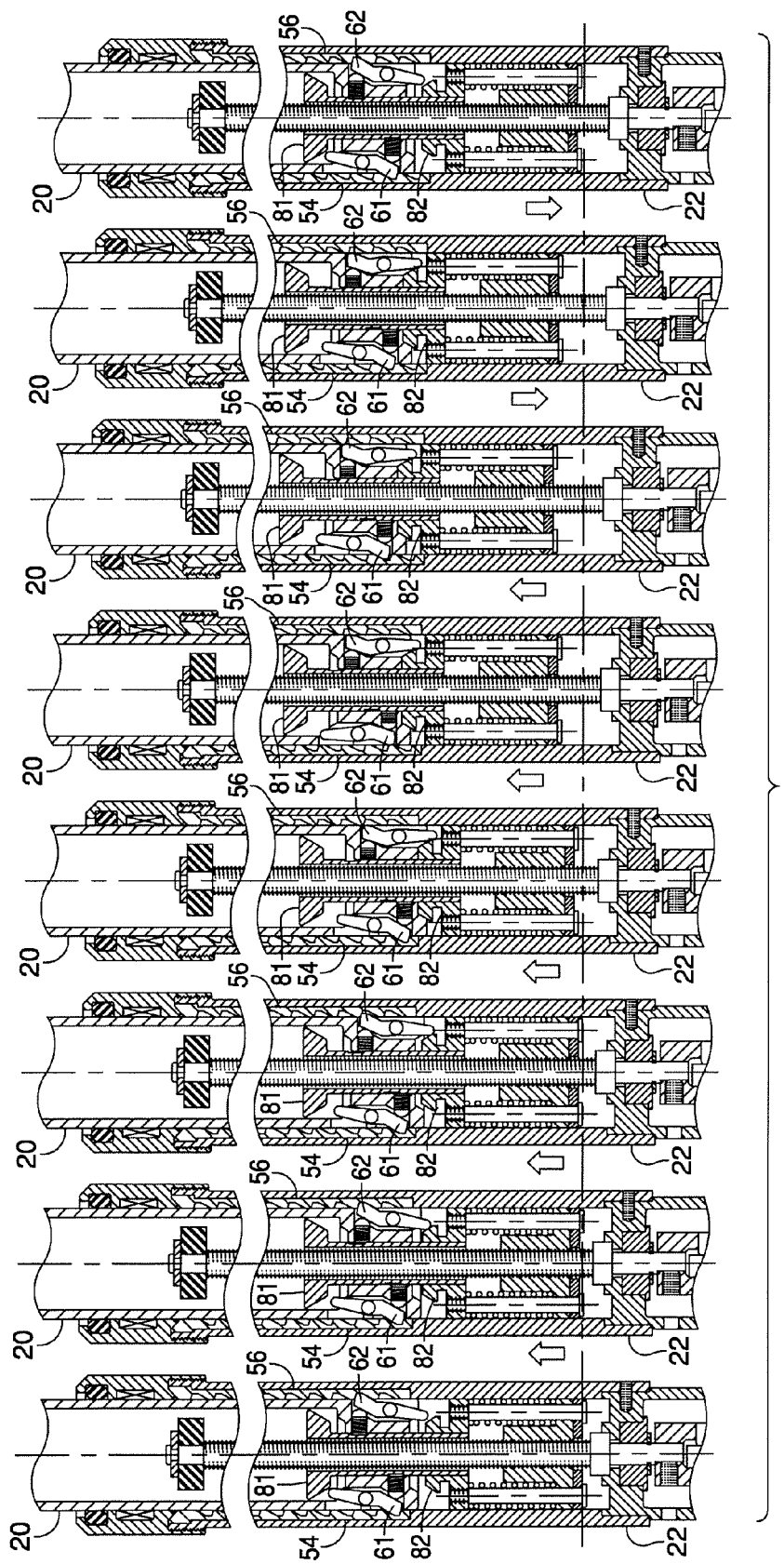
FIG. 8 is a series of longitudinal cross sectional views of a portion of the telescoping seatpost part as seen along section line 4-A-5 of FIG. 3 showing an expansion operation of the inner (upper) tube with respect to the outer (lower) tube, with the left half of the cross section of the telescoping seatpost part corresponding to the cross section illustrated in FIG. 4 and the right half of the cross section of the telescoping seatpost part corresponding to the cross section illustrated in FIG. 5.
Figure 9:
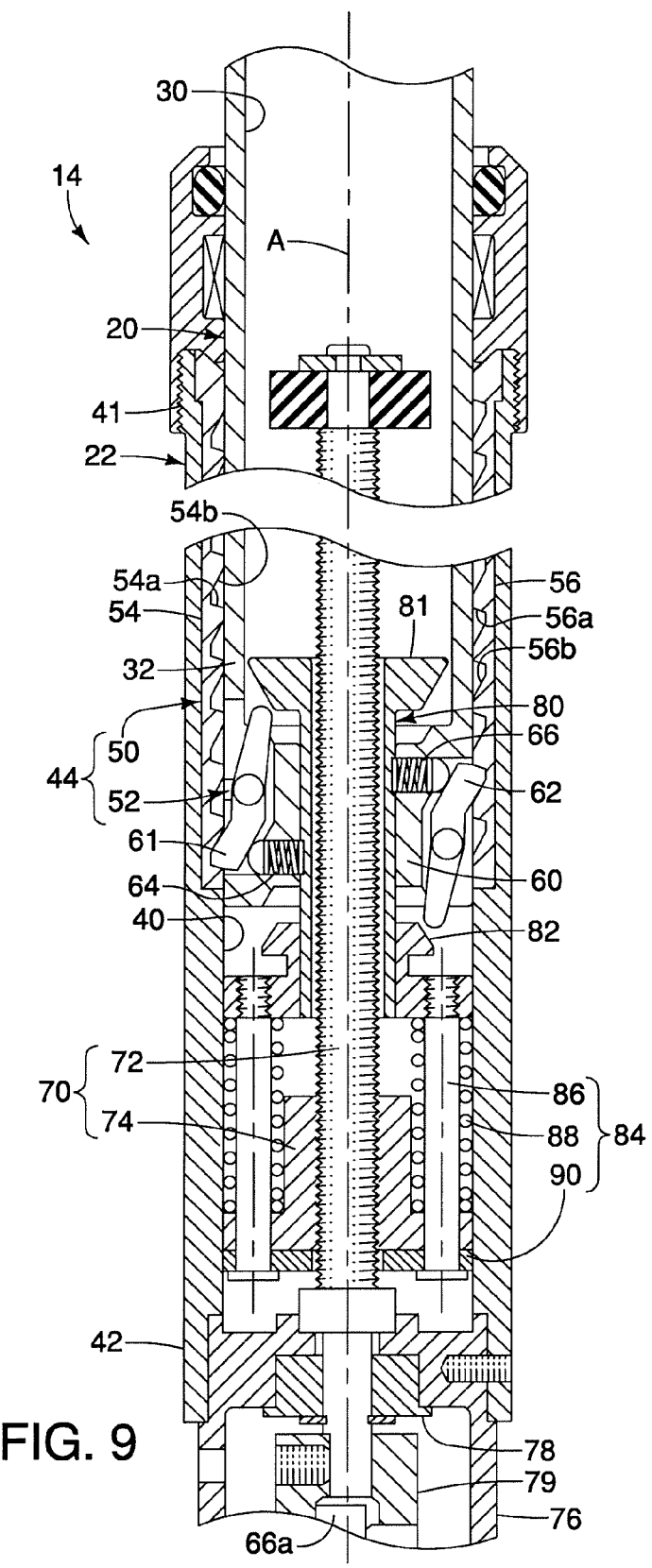
FIG. 9 is a longitudinal cross sectional view of a portion of the telescoping seatpost part corresponding to the first drawing of FIG. 8 showing a starting seat position of the expansion operation illustrated in FIG. 8.
Figure 10:
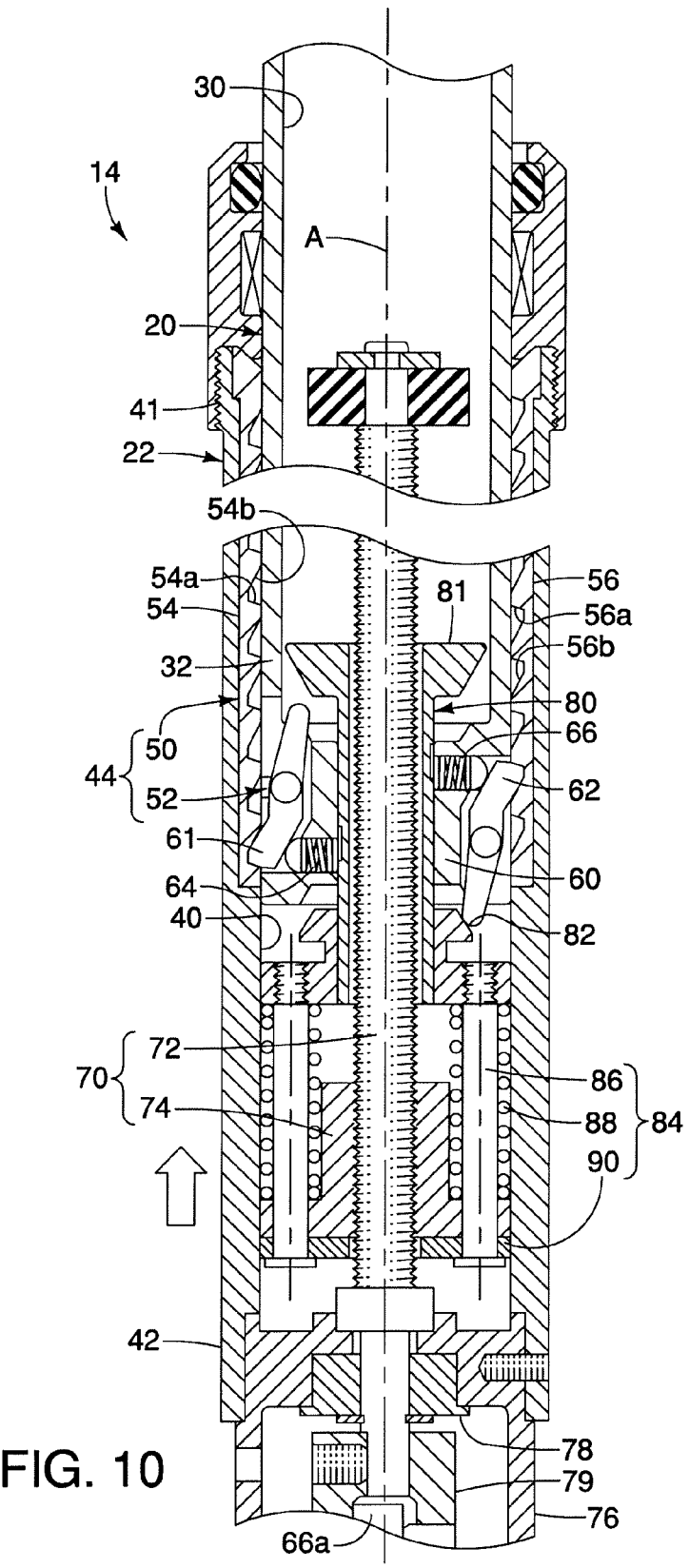
FIG. 10 is a longitudinal cross sectional view of a portion of the telescoping seatpost part corresponding to the second drawing of FIG. 8 showing the screw nut and the pawl release structure moving upward together from FIG. 9 such that the lower cam portion of the pawl release structure contacts the upward movement stop pawl members.
Figure 11:
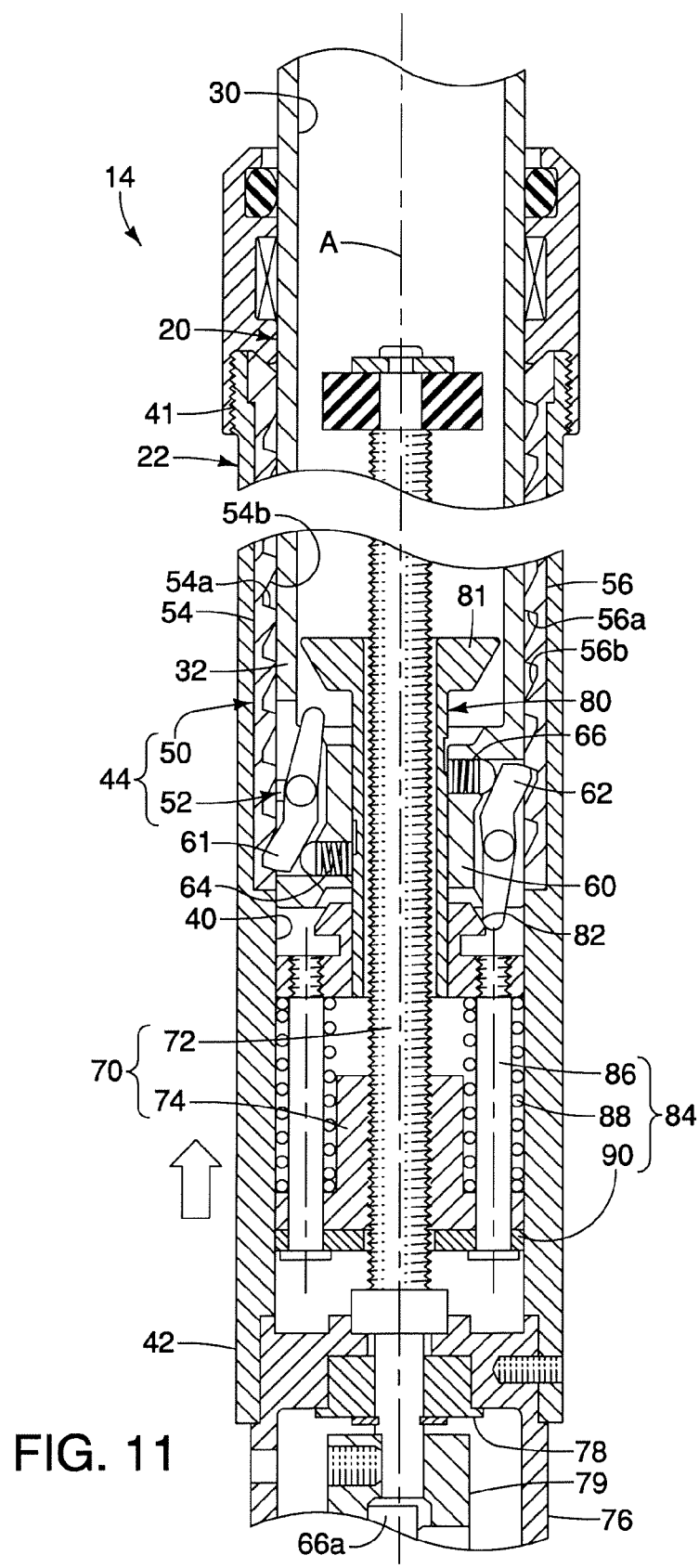
FIG. 11 is a longitudinal cross sectional view of a portion of the telescoping seatpost part corresponding to the third drawing of FIG. 8 showing the screw nut and the pawl release structure moving farther upward from FIG. 10 such that the lower cam portion starts pivoting the upward movement stop pawl members out of engagement from the teeth of the ratchet tooth structure before moving the inner (upper) tube relative to the outer (lower) tube.
Figure 12:
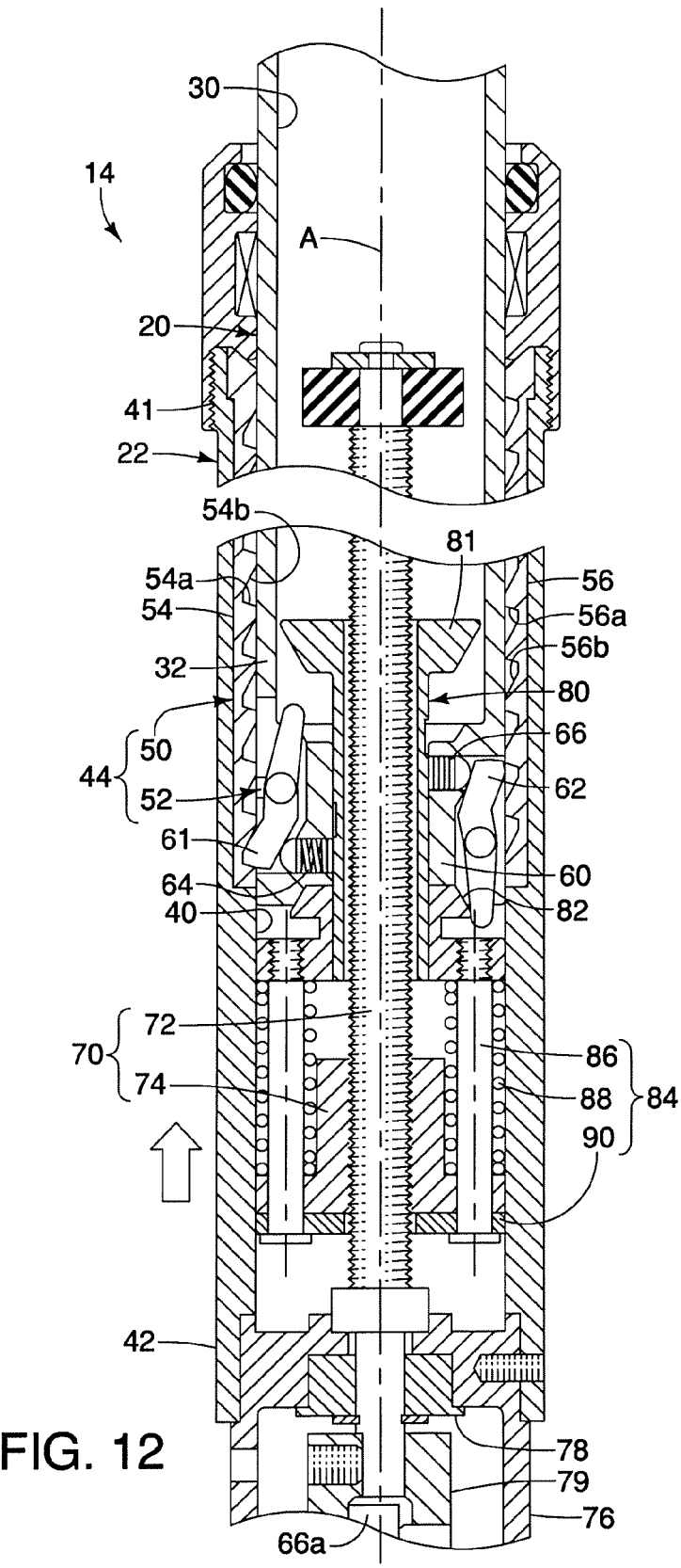
FIG. 12 is a longitudinal cross sectional view of a portion of the telescoping seatpost part corresponding to the fourth drawing of FIG. 8 showing the screw nut and the pawl release structure moving farther upward from FIG. 11 such that the upward movement stop pawl members are moved completely out of engagement from the teeth of the ratchet tooth structure by the lower cam portion before moving the inner (upper) tube relative to the outer (lower) tube.
Figure 13:
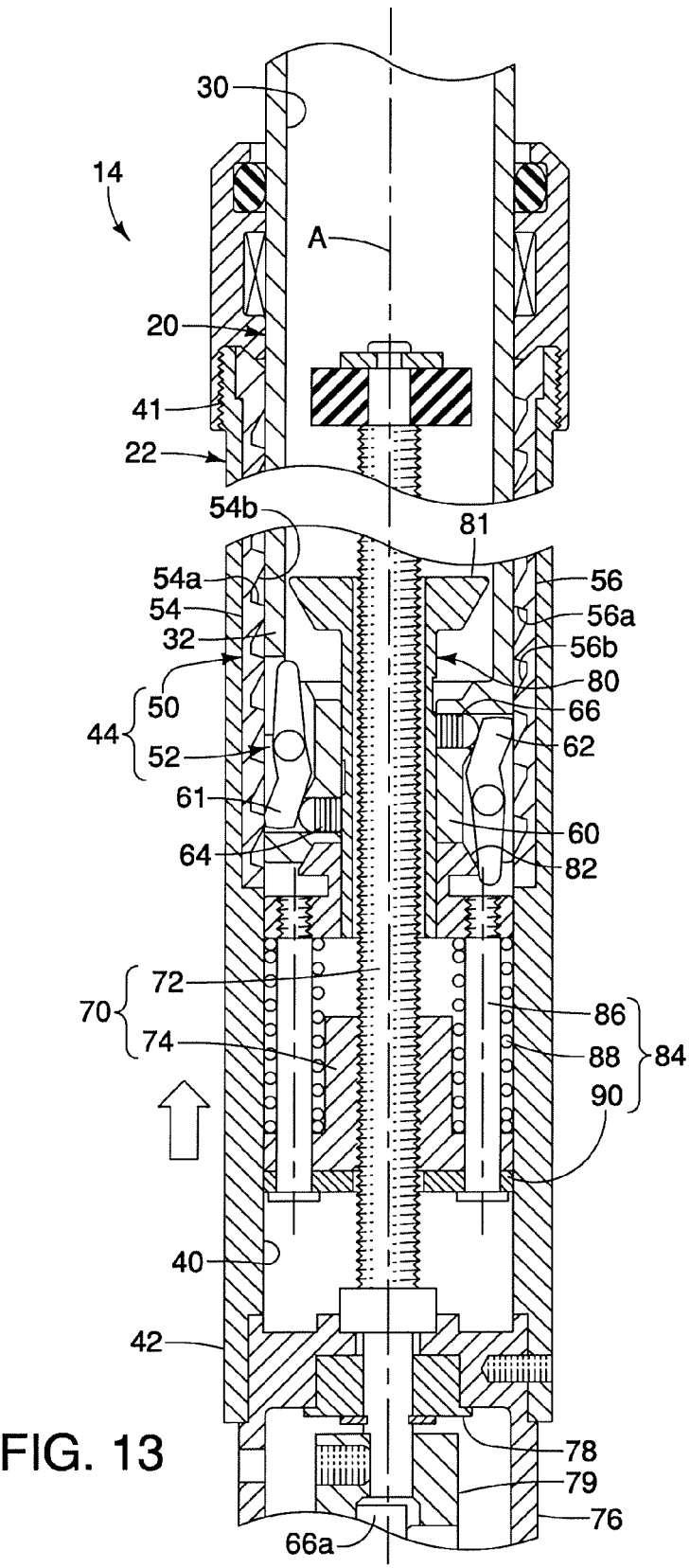
FIG. 13 is a longitudinal cross sectional view of a portion of the telescoping seatpost part corresponding to the fifth drawing of FIG. 8 showing the screw nut and the pawl release structure moving farther upward from FIG. 12 such that the lower cam portion moves the pawl holder and the inner (upper) tube upward as a unit relative to the outer (lower) tube.
Figure 14:
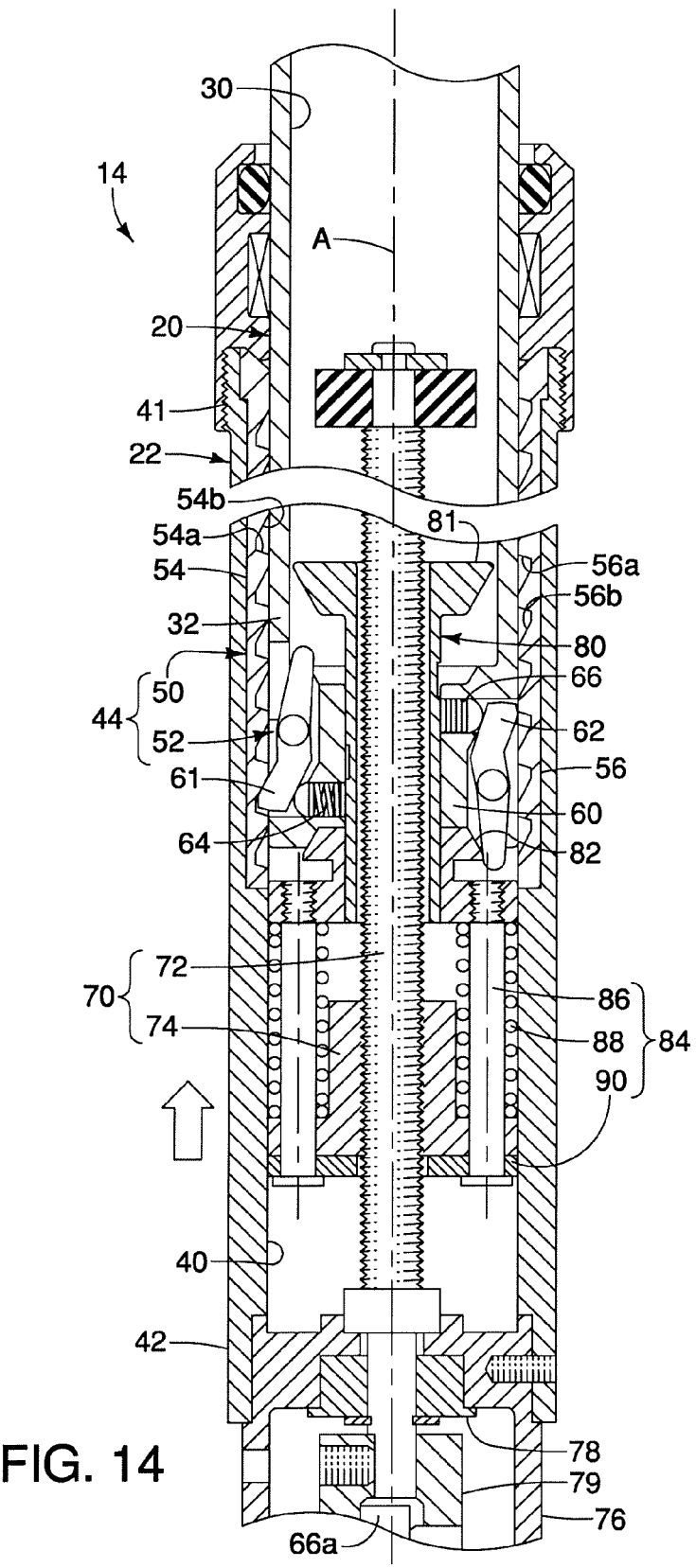
FIG. 14 is a longitudinal cross sectional view of a portion of the telescoping seatpost part corresponding to the sixth drawing of FIG. 8 showing the screw nut and the pawl release structure moving farther upward from FIG. 13 to slightly higher than the preset seat position such that the downward movement stop pawl members engage the next higher teeth of the ratchet tooth structure and the upward movement stop pawl members are contacting areas between two of the teeth of the ratchet tooth structure.

Referring now to FIGS. 5 to 7, the height adjustment device 24 will now be discussed in more detail. The height adjustment device 24 operatively coupled between the second end 32 of the inner tube 20 and the outer tube 22. In the illustrated embodiment, the height adjustment device 24 mainly includes a ratchet mechanism 44 and a drive source 46. The ratchet mechanism 44 is designed to lockout the drive source 46 such that when the rider sit down the seat 13, the downward force from the rider's weight is not transmitted to the drive source 46. In other words, when the ratchet mechanism 44 is locked, as discussed below, the drive source 46 is unloaded with respect to a downward force being exerted on the seat 13 by the rider or other external force. In other words, the ratchet mechanism 44 constitutes a lockout mechanism that can support a rider's weight so that the rider's weight is not transmitted to the drive source 46 of the height adjustment device 24 once the height of the seat 13 is set to a desired seat position for the rider.

In the illustrated embodiment, as seen in FIGS. 4 and 5, the ratchet mechanism 44 includes a ratchet tooth structure 50 and a pawl structure 52 for selectively locking the inner and outer tubes 20 and 22 together against axial movement with respect to the longitudinal axis A of the inner and outer tubes 20 and 22. In other words, the pawl structure 52 is movably arranged to move between a lock position and a movable position with respect to the ratchet tooth structure 50. The pawl structure 52 is engaged with the ratchet tooth structure 50 in the lock position. In the second end 32 of the inner tube 20 being disposed inside the first end 41 of the outer tube 22, the pawl structure 52 is mounted to the inner tube 20 and the ratchet tooth structure 50 mounted to an interior surface of the outer tube 22. As explained below, the pawl structure 52 is movably coupled with respect to the ratchet tooth structure 50 in the movable position such that the inner and outer tubes 20 and 22 are movably arranged relative to each other in at least one axial direction of the inner and outer tubes 20 and 22.

In the illustrated embodiment, as seen in FIGS. 4 and 5, the ratchet tooth structure 50 includes a set of first ratchet teeth 54 and a set of second ratchet teeth 56. The first and second ratchet teeth 54 and 56 are formed on the interior surface of the outer tube 22. In the illustrated embodiment, the first ratchet teeth 54 are formed as a pair of rack inserts that are spaced 180° apart and disposed in linear recesses in the interior surface of the outer tube 22. Similarly, the second ratchet teeth 56 are formed as a pair of rack inserts that are spaced 180° apart and disposed in linear recesses in the interior surface of the outer tube 22. While the first and second ratchet teeth 54 and 56 are preferably linear ratchet teeth as illustrated, it is not necessary that the ratchet teeth be linearly arranged on the interior surface of the outer tube 22. Other arrangements of the first and second ratchet teeth 54 and 56 are possible. For example it is possible for the ratchet teeth to be spirally arranged on the interior surface of the outer tube 22.

The first ratchet teeth 54 have a pawl abutment 54a that selectively engages the pawl structure 52 in the lock position to prevent axial retraction of the inner and outer tubes 20 and 22. The second ratchet teeth 56 have a pawl abutment 56a that selectively engages the pawl structure 52 in the lock position to prevent axial expansion of the inner and outer tubes 20 and 22.

In the illustrated embodiment, as seen in FIGS. 4 to 6, the pawl structure 52 of the ratchet mechanism 44 mainly includes a connection structure or pawl holder 60, a pair of first stop pawl members 61 and a pair of second stop pawl members 62. While two of the first stop pawl members 61 and two of the second stop pawl members 62 are used in the illustrated embodiment, it is acceptably to use only one first stop pawl member and only one second stop pawl.

The pawl holder 60 is fixed to the second end 32 of the inner tube 20 with the first and second stop pawl members 61 and 62 pivotally mounted to the pawl holder 60 for movement into and out of engagement with the first and second ratchet teeth 54 and 56 as discussed below. Thus, the pawl holder 60 constitutes a pawl holder. While the pawl holder 60 is illustrated are being integrally formed with the second end 32 of the inner tube 20, it is preferably to have the pawl holder 60 attached to the second end 32 of the inner tube 20 in a releasable manner such as by a screw connection (not shown). As seen in FIG. 6, the outer surface of the pawl holder 60 has a plurality of anti-rotation projections or keys 60a that slidably engage longitudinally extending slots (not shown) formed on the interior bore 40 of the outer tube 22 for preventing relative rotation of the inner and outer tubes 20 and 22.

The first stop pawl members 61 are configured and arranged to prevent downward movement of the inner tube 20 with respect to the outer tube 22 as seen in FIG. 4, while the second stop pawl members 62 are configured and arranged to prevent upward movement of the inner tube 20 with respect to the outer tube 22 as seen in FIG. 5. When the seat 13 is in one of the preset seat positions, the first stop pawl members 61 are engaged with the first ratchet teeth 54 and the second stop pawl members 62 are engaged with the second ratchet teeth 56. Also, when the seat 13 is in one of the preset seat positions, a downward force on the inner tube 20 will not be transmitted to the drive source 46 due to the engagement of the first stop pawl members 61 with the first ratchet teeth 54.

As seen in FIGS. 8 to 16, an expansion operation (i.e., raising the inner tube 20 with respect to the outer tube 22) of the telescoping seatpost part 14 is illustrated. While the expansion operation illustrated in FIGS. 8 to 16 shows only the inner tube 20 being raised by a single prescribed tooth pitch or axial distance D1 (e.g., 4.5 mm to 5.0 mm) between two adjacent ones of the pawl abutments 54a, preferably, an expansion operation raises the inner tube 20 by a distance corresponding to several of the pawl abutments 54a of the first ratchet teeth 54. During an expansion operation of the telescoping seatpost part 14, the first stop pawl members 61 are ratcheted upward against the first ratchet teeth 54, while the second stop pawl members 62 are held out of engagement from the second ratchet teeth 56 as discussed below.

As seen in FIGS. 8 to 24, the first stop pawl members 61 are movably arranged between first lock positions and first free positions with respect to the first ratchet teeth 54 in response to a drive operation of the drive source 46 in an axial direction with respect to the inner and outer tubes 20 and 22. In the case of a retraction operation (i.e., lowering the inner tube 20 with respect to the outer tube 22) of the telescoping seatpost part 14, the first stop pawl members 61 are moved from the first lock positions to the first free positions with respect to the first ratchet teeth 54 in response to a first drive operation of the drive source 46 in a first (downward) axial direction with respect to the inner and outer tubes 20 and 22. The first stop pawl members 61 are biased towards the first lock positions by biasing elements 64. Each of the first stop pawl members 61 contacts one of the pawl abutments 54a of the first ratchet teeth 54 in the first lock position to prevent downward movement of the inner tube 20 with respect to the outer tube 22 as seen in FIG. 4. Due to the shape of cam surfaces 54b of the first ratchet teeth 54, the inner tube 20 can move upward with respect to the outer tube 22 with a ratcheting action occurring between the first stop pawl members 61 and the first ratchet teeth 54 during upward movement of the inner tube 20 with respect to the outer tube 22. More specifically, initially during upward movement of the inner tube 20 with respect to the outer tube 22, the cam surfaces 54b of the first ratchet teeth 54 push the first stop pawl members 61 radially inward against the biasing forces of the biasing elements 64 until the first stop pawl members 61 exit the current teeth of the first ratchet teeth 54. Then with further upward movement of the inner tube 20 with respect to the outer tube 22, the biasing forces of the biasing elements 64 move the first stop pawl members 61 radially outward into the next teeth of the first ratchet teeth 54. This ratcheting action of the first stop pawl members 61 with the first ratchet teeth 54 continues until the first stop pawl members 61 reach the desired position.

As seen in FIGS. 17 to 24, a retraction operation (i.e., lowering the inner tube 20 with respect to the outer tube 22) of the telescoping seatpost part 14 is illustrated. While the retraction operation illustrated in FIGS. 17 to 24 shows only the inner tube 20 being lowered by the prescribed tooth pitch or axial distance D1 between two adjacent ones of the pawl abutments 54a, preferably, a retraction operation lowers the inner tube 20 to the bottom preset seatpost position. During a retraction operation of the telescoping seatpost part 14, the second stop pawl members 62 are ratcheted downward against the second ratchet teeth 56, while the first stop pawl members 61 are held out of engagement from the first ratchet teeth 54 as discussed below.

As seen in FIGS. 8 to 24, the second stop pawl members 62 are movably arranged between second lock positions and second free positions with respect to the second ratchet teeth 56 in response to a drive operation of the drive source 46 in an axial direction with respect to the inner and outer tubes 20 and 22. In the case of an expansion operation (i.e., raising the inner tube 20 with respect to the outer tube 22) of the telescoping seatpost part 14, the second stop pawl members 62 are moved from the second lock positions and the second free positions with respect to the second ratchet teeth 56 in response to a second drive operation of the drive source 46 in a second (upward) axial direction with respect to the inner and outer tubes 20 and 22. The second stop pawl members 62 are biased towards the second lock positions by biasing elements 66. Each of the second stop pawl members 62 contacts one of the pawl abutments 56a of the second ratchet teeth 56 in the second lock position to prevent upward movement of the inner tube 20 with respect to the outer tube 22 as seen in FIG. 5. Due to the shape of cam surfaces 56b of the second ratchet teeth 56, the inner tube 20 can move downward with respect to the outer tube 22 with a ratcheting action occurring between the second stop pawl members 62 and the second ratchet teeth 56 during downward movement of the inner tube 20 with respect to the outer tube 22. More specifically, initially during downward movement of the inner tube 20 with respect to the outer tube 22, the cam surfaces 56b of the second ratchet teeth 56 push the second stop pawl members 62 radially inward against the biasing forces of the biasing elements 66 until the second stop pawl members 62 exit the current teeth of the second ratchet teeth 56. Then with further downward movement of the inner tube 20 with respect to the outer tube 22, the biasing forces of the biasing elements 66 move the second stop pawl members 62 radially outward into the next teeth of the second ratchet teeth 56. This ratcheting action of the second stop pawl members 62 with the second ratchet teeth 56 continues until the second stop pawl members 62 reach the desired position.

Now the drive source 46 will be discussed in more detail. The drive source 46 is operatively connected to the pawl structure 52 to move the pawl structure 52 between the lock position and the movable position in response to operation of the drive source 46. More specifically, the drive source 46 is operatively connected between the inner and outer tubes 20 and 22 through the pawl structure 52 of the ratchet mechanism 44 to axially move the inner and outer tubes 20 and 22 relative to each other in response to operation of the drive source 46. In the illustrated embodiment, as seen in FIG. 6, the drive source 46 is provided with a rotary encoder 62, a reversible electric motor 64, a gear reduction unit 66, a joining structure 68 and a linear movement mechanism 70.

In this illustrated embodiment, the linear movement mechanism 70 is mainly formed by a drive screw 72 and a screw nut 74, with the screw nut 74 threadedly engaged with the drive screw 72 such that the screw nut 74 moves in an axial direction of the drive screw 72 in response to relative rotational movement between the drive screw 72 and the screw nut 74. Of course, other types of linear movement mechanisms can be used as needed and/or desired.

The rotary encoder 62 is a rotation detecting device that detects a rotation amount of the motor 64. In the illustrated embodiment, the rotary encoder 62 is an electro-mechanical device that converts the angular position of a shaft, axle, gear or other rotating part of the motor 64 to an analog or digital position signal that is sent to the controller 26. Using feedback control based on the position signal from the rotary encoder 62, the controller 26 sends an operating signal to the motor 64 for controlling the operation (rotation) of the motor 64 to output a desired amount rotational movement to the linear movement mechanism 70 via the gear reduction unit 66. In this way, the controller 26 can operate the linear movement mechanism 70 to obtain the desired seat position.

In this illustrated embodiment, the motor 64 is a reversible electric motor that is rigidly secured to the second end 32 of the outer tube 22 via the joining structure 68. Reversible electric motor such as the motor 64, are well known, and thus, the motor 64 will not be discussed and/or illustrated in detail.

The gear reduction unit 66 reduces the rotational speed of the motor 64 while maintaining a constant output torque. In this way, the gear reduction unit 66 transfers the rotation of the motor 64 to the linear movement mechanism 70 at a lower speed and a higher torque. Gear reduction units, such as the gear reduction unit 66, are well known, and thus, the gear reduction unit 66 will not be discussed and/or illustrated in detail.

The joining structure 68 securely fastens the drive source 46 to the second end 42 of the outer tube 22 with the rotary encoder 62, the reversible electric motor 64 and the gear reduction unit 66 being located outside of the outer tube 22 and the linear movement mechanism 70 being disposed within the inside of the outer tube 22. The joining structure 68 securely fastens the drive source 46 to the second end 42 of the outer tube 22 with the rotary encoder 62, the motor 64 and the gear reduction unit 66 being located outside of the outer tube 22 and the linear movement mechanism 70 being disposed within the inside of the outer tube 22. However, the rotary encoder 62, the motor 64 and the gear reduction unit 66 can be disposed in the first end 31 of the inner tube 20 if needed and/or desired. In this illustrated embodiment, as best seen in FIG. 6, the joining structure 68 includes a tubular housing 76, a bushing 78 and a sleeve joint 79. The tubular housing 76 is formed of several sections that are threaded together for enclosing and supporting the rotary encoder 62, the reversible electric motor 64 and the gear reduction unit 66. The bushing 78 rotatably receives the lower end of the drive screw 72. The sleeve joint 79 fastens the lower end of the drive screw 72 to an output shaft 66a of the gear reduction unit 66 so that the drive screw 72 rotates in response to operation of the motor 64.

Generally speaking, the linear movement mechanism 70 is operatively disposed between the inner and outer tubes 20 and 22 to change the overall length of the telescoping seatpost part 14. In this illustrated embodiment, the drive screw 72 of the linear movement mechanism 70 is axially stationary with respect to the outer tube 22, but rotates with respect to the outer tube 22. On the other hand, the screw nut 74 of the linear movement mechanism 70 is axially and rotationally stationary with respect to the inner tube 20. Thus, rotation of the drive screw 72 by the motor 64 causes the inner tube 20 to move axially with respect to the outer tube 22 for expanding and contracting the overall length of the telescoping seatpost part 14.

In this illustrated embodiment, the drive source 46 further includes a pawl release structure 80 that mainly includes a first cam portion 81 and a second cam portion 82. The pawl release structure 80 moves linearly within at least one of the inner and outer tubes 20 and 22 such that the first and second cam portions 81 and 82 of the pawl release structure 80 selectively moves the first and second stop pawl members 61 and 62 of the pawl structure 52, respectively, between the lock position and the movable position. The linear movement mechanism 70 of the drive source 46 moves the pawl structure 52 in a first (downward) axial direction of the inner and outer tubes 20 and 22 to disengage the first stop pawl members 61 from the first ratchet teeth 54. The linear movement mechanism 70 of the drive source 46 moves the pawl release structure 80 in a second (upward) axial direction of the inner and outer tubes 20 and 22 to disengage the second stop pawl members 62 from the second ratchet teeth 56. The pawl release structure 80 is connected to the screw nut 74 of the linear movement mechanism 70 by a saver mechanism 84, which provides overload protection to the drive source 46 as discussed below.

Basically, the linear movement mechanism 70 selectively moves the first and second cam portions 81 and 82 of the pawl release structure 80 together in an axial direction of the inner and outer tubes 20 and 22. The first cam portion 81 is movably arranged with respect to the pawl holder 60 such that engagement of the first cam portion 81 with the first stop pawl members 61 causes disengagement of the first stop pawl members 61 from the first ratchet teeth 54. The second cam portion 82 is movably arranged with respect to the pawl holder 60 such that engagement of the second cam portion 82 with the second stop pawl members 62 causes disengagement of the second stop pawl members 62 from the second ratchet teeth 56. The linear movement mechanism 70 moves the first cam portion 81 of the pawl release structure 80 into engagement with the first stop pawl members 61 of the pawl structure 52 when the linear movement mechanism 70 is operated to shorten the overall height of the telescoping seatpost part 14. The linear movement mechanism 70 moves the second cam portion 82 of the pawl release structure 80 into engagement with the second stop pawl members 62 of the pawl structure 52 when the linear movement mechanism 70 is operated to lengthen the overall height of the telescoping seatpost part 14. The linear movement mechanism 70 is arranged with respect to the first and second stop pawl members 61 and 62 of the pawl structure 52 and the inner and outer tubes 20 and 22 such that the linear movement mechanism 70 moves one of the first and second cam portions 81 and 82 of the pawl release structure 80 into engagement with one of the first and second stop pawl members 61 and 62 of the pawl structure 52 to disengage one of the first and second stop pawl members 61 and 62 of the pawl structure 52 from the ratchet tooth structure 50 prior to moving the inner and outer tubes 20 and 22 relative to each other in response to operation of the linear movement mechanism 70 of the drive source 46.

In height shortening operation of the overall height of the telescoping seatpost part 14, the linear movement mechanism 70 causes the first cam portion 81 of the pawl release structure 80 to move downward in an axial direction into direct engagement with the first stop pawl members 61 of the pawl structure 52. This downward movement of the first cam portion 81 then causes the first stop pawl members 61 of the pawl structure 52 to pivot out of engagement from the first ratchet teeth 54 of the ratchet tooth structure 50 before moving the inner tube 20 relative to the outer tube 22. Thus, a prescribed amount of lost motion occurs in the linear movement mechanism 70 between the point that the screw nut 74 starts moving axially and the point that the inner tube 20 starts moving axially relative to the outer tube 22. Once the first stop pawl members 61 of the pawl structure 52 disengage from the first ratchet teeth 54 of the ratchet tooth structure 50, further operation of the linear movement mechanism 70 causes the first cam portion 81 to directly contact the pawl holder 60 and to move the inner tube 20 downward relative to the outer tube 22. During this height shortening operation of the overall height of the telescoping seatpost part 14, the second stop pawl members 62 of the pawl structure 52 are ratcheted against the second teeth of 56 the ratchet tooth structure 50.

In a height lengthening operation of the overall height of the telescoping seatpost part 14, the linear movement mechanism 70 causes the second cam portion 82 of the pawl release structure 80 to move upward in an axial direction into direct engagement with the second stop pawl members 62 of the pawl structure 52. This upward movement of the second cam portion 82 then causes the second stop pawl members 62 of the pawl structure 52 to pivot out of engagement from the second ratchet teeth 56 of the ratchet tooth structure 50 before moving the inner tube 20 relative to the outer tube 22. Thus, again, a prescribed amount of lost motion occurs in the linear movement mechanism 70 between the point that the screw nut 74 starts moving axially and the point that the inner tube 20 starts moving axially relative to the outer tube 22. Once the second stop pawl members 62 of the pawl structure 52 disengage from the second ratchet teeth 56 of the ratchet tooth structure 50, further operation of the linear movement mechanism 70 causes the second cam portion 82 to directly contact the pawl holder 60 and to move the inner tube 20 upward relative to the outer tube 22. During this height lengthening operation of the overall height of the telescoping seatpost part 14, the first stop pawl members 61 of the pawl structure 52 are ratcheted against the first ratchet teeth 54 of the ratchet tooth structure 50.

Figure 25:
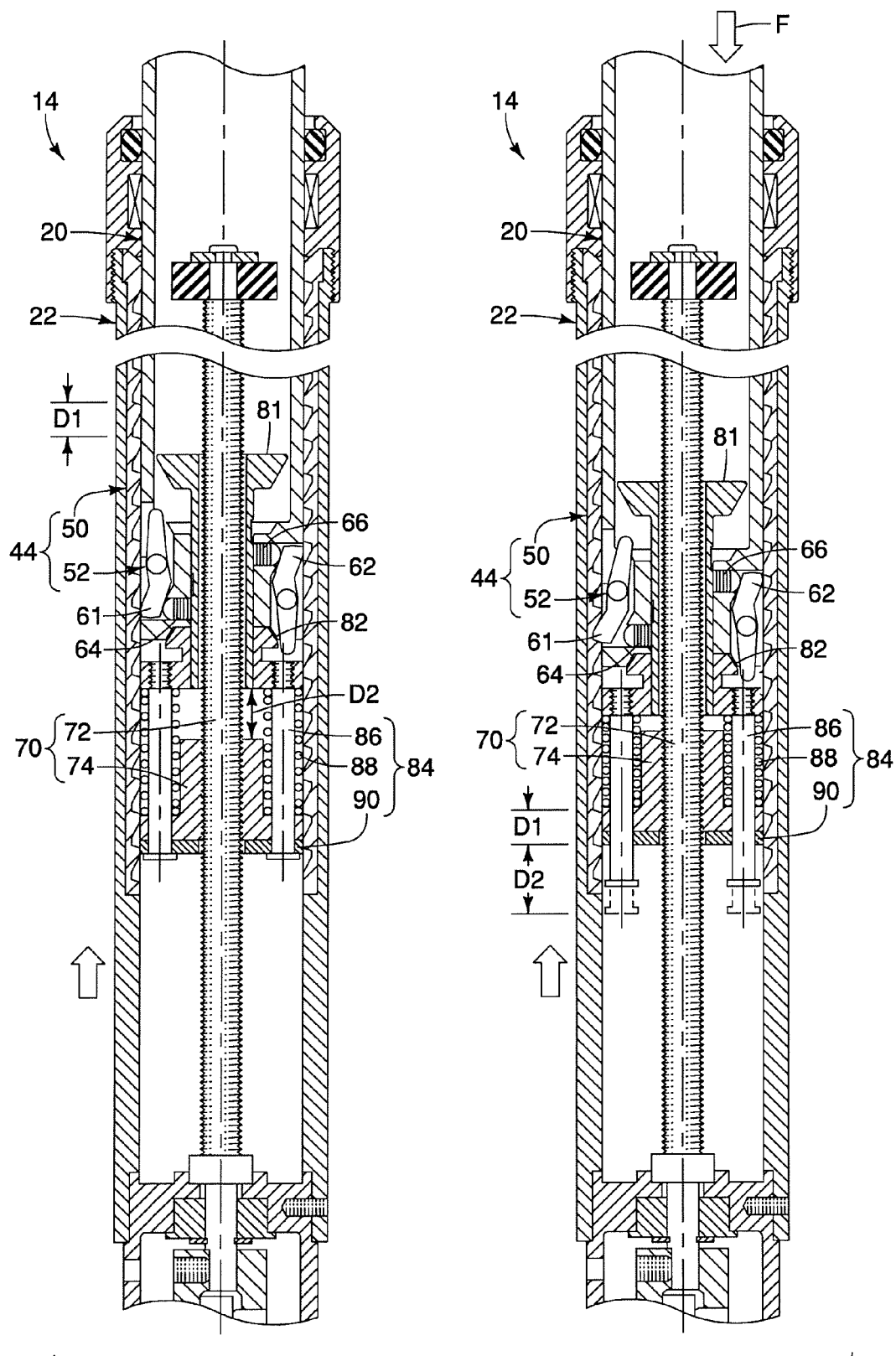
FIG. 25 is a pair of longitudinal cross sectional views showing operation of the saver mechanism during an expansion operation of the upper tube with respect to the lower tube, with the left half of the cross section of the telescoping seatpost part corresponding to the cross section illustrated in FIG. 4 and the right half of the cross section of the telescoping seatpost part corresponding to the cross section illustrated in FIG. 5.

As best seen in FIG. 25, the saver mechanism 84 provides overload protection to the drive source 46 by moving between a force transmitting state (left side of FIG. 25) and a force override state (right side of FIG. 25). The pawl release structure 80 is connected to the screw nut 74 by the saver mechanism 84 so that they move together. The saver mechanism 84 is mainly used only when the seat 13 is being raised and the rider sits on the seat 13 during an expansion operation.

The saver mechanism 84 mainly includes a pair of bolts 86, a pair of compression springs 88 and a plate 90. The bolts 86 have shafts that extend through bores in the screw nut 74 and the plate 90. The threaded ends of the bolts 86 are threaded into threaded holes of the second cam portion 82 so that the bolts 86 move with the second cam portion 82. The heads of the bolts 86 are arranged to support the screw nut 74 and the plate 90. The compression springs 88 are disposed on the shafts of the bolts 86 between the screw nut 74 and the second cam portion 82 to bias the screw nut 74 and the plate 90 against the heads of the bolts 86. As seen in FIG. 6, the outer surface of the plate 90 has a plurality of anti-rotation projections or keys 90a that slidably engage longitudinally extending slots (not shown) of the interior bore 40 of the outer tube 22 to prevent relative rotation between the saver mechanism 84 and the screw nut 74 with respect to the outer tube 22.

In this arrangement of the saver mechanism 84, the second cam portion 82 can move axially downward on the bolts 86 towards the screw nut 74 to a force override state (right side of FIG. 25) by compressing the compression springs 88. Normally, the spring force of the compression springs 88 is large enough such that the screw nut 74 and the second cam portion 82 move together as a unit in a force transmitting state (left side of FIG. 25). In other words, the spring force of the compression springs 88 is large enough so that the compression springs 88 are not compress during normal operation (i.e., without an external force applied to the telescoping seatpost part 14) of the drive source 46. However, when an external force is applied to the telescoping seatpost part 14 and the drive source 46 is rotating the drive screw 72 to move the screw nut 74 upward, the compression springs 88 will compress if the first stop pawl members 61 of the pawl structure 52 are disengaged from the first ratchet teeth 54 of the ratchet tooth structure 50. Thus, the compression springs 88 constitute an elastic structure that is operatively disposed between the screw nut 74 and the pawl structure 52 to provide a prescribed arrange of relative axial movement of the pawl structure 52 relative to the screw nut 74 when a downward force is applied to the inner tube 20 during a height lengthening operation to increase the overall height of the telescoping seatpost part 14. The saver mechanism 84 has a prescribed axial stroke D2 that is larger than the prescribed tooth pitch or axial distance D1 between axially adjacent ones of the pawl abutments 54a of the first ratchet teeth 54, but shorter than double of the interval of the pawl abutments 54a of the first ratchet teeth 54. For example, if the interval distance of the prescribed tooth pitch or axial distance D1 between axially adjacent ones of the pawl abutments 54a of the first ratchet teeth 54 is about 4.5 or 5.0 mm, then the prescribed axial stroke D2 can be 7.0 mm.

When the seat 13 is in the process of being raised, if the rider sits on the seat, then the compression springs 88 will compress by an amount greater the prescribed tooth pitch or axial distance D1 between axially adjacent ones of the pawl abutments 56a of the second ratchet teeth 56. In this way, the first stop pawl members 61 of the pawl structure 52 move outward into engagement with the next lower one of the first teeth of 54 of the ratchet tooth structure 50. Thus, the saver mechanism 84 protects the linear movement mechanism 70 (e.g., the drive screw 72 and the screw nut 74) when the load is given to seatpost all of a sudden (e.g., the rider sits on the seat 13).

The linear movement mechanism 70 selectively moves the inner tube 20 relative to the outer tube 22 in a first (downward) axial direction that decreases an overall effective length of the height adjustable seatpost while the saver mechanism 84 is in a force transmitting state. The linear movement mechanism 70 selectively moves the inner tube 20 relative to the outer tube 22 in a second (upward) axial direction that is opposite the first (downward) axial direction to increase the overall effective length of the height adjustable seatpost while the saver mechanism 84 is in the force transmitting state. The saver mechanism 84 provides a prescribed arrange of movement of the inner tube 20 in the first (downward) axial direction while the saver mechanism 84 is in the force override state.

The controller 26 operatively connected to the drive source 46 with the controller 26 having a plurality of different preset seat position settings that selectively operate the drive source 46 to move the inner and outer tubes 20 and 22 relative to each other. The controller 26 uses signals from the rotary encoder 62, which detects a rotation amount of the motor 64 when the controller 26 operates the motor 64 to determine an operation amount of the motor 64. The rotary encoder 62 determines the rotational amount of the motor 64 for determining the preset seat positions.

Figure 27:
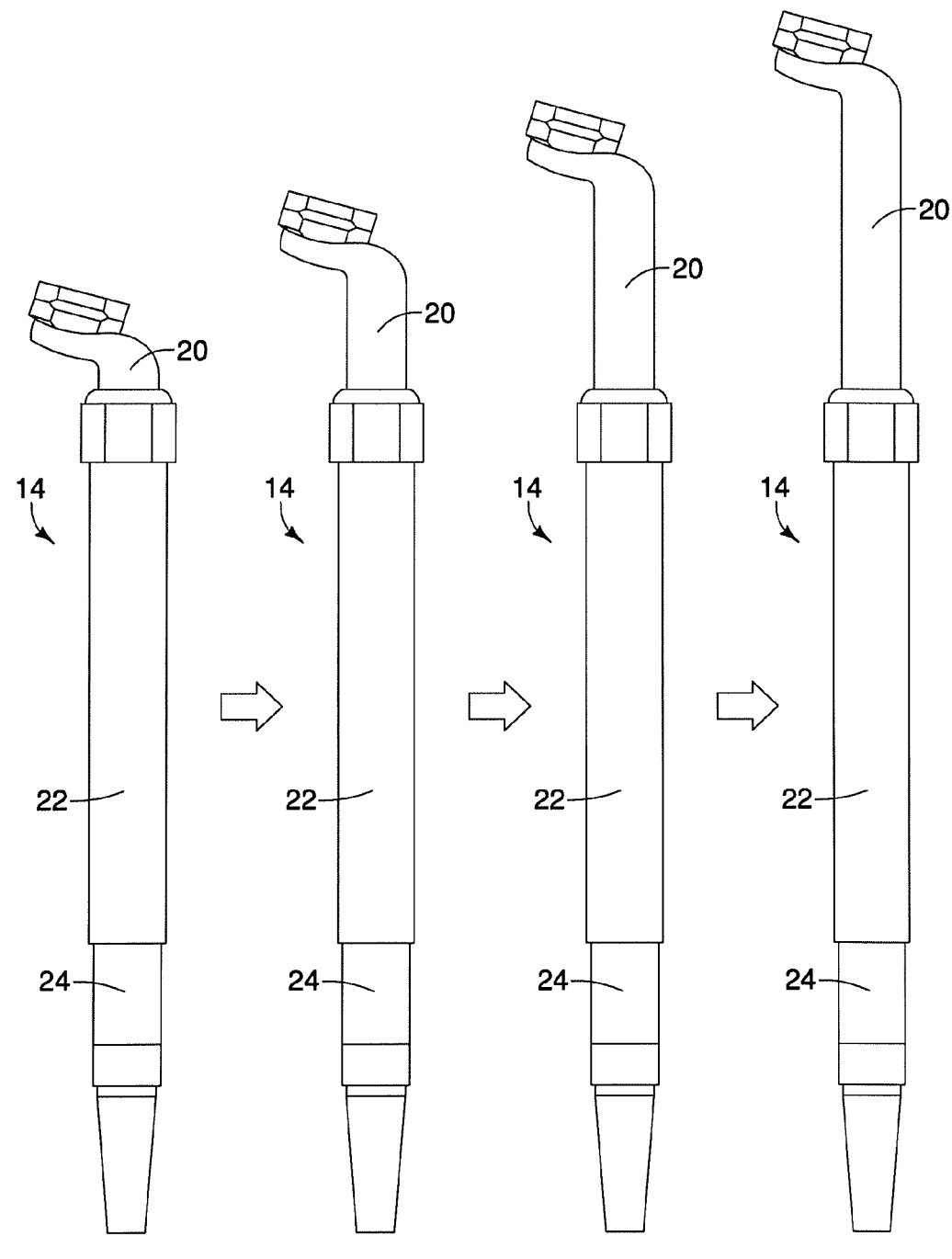
FIG. 27 is a series side elevational views of the telescoping seatpost part illustrated in FIGS. 1 to 25 showing four different preset seat positions.

In this embodiment, as seen in FIG. 27, the length of the inner and outer tubes 20 and 22 is adjustable to four preset seatpost positions, e.g., the bottom preset seatpost position, the lower middle preset seatpost position, the upper middle preset seatpost position, and the top preset seatpost position. More specifically, the controller 26 operates the height adjustment device 24 by selectively supplying electricity to the height adjustment device 24 based on the signal from the operating switch 28.

Figure 28:
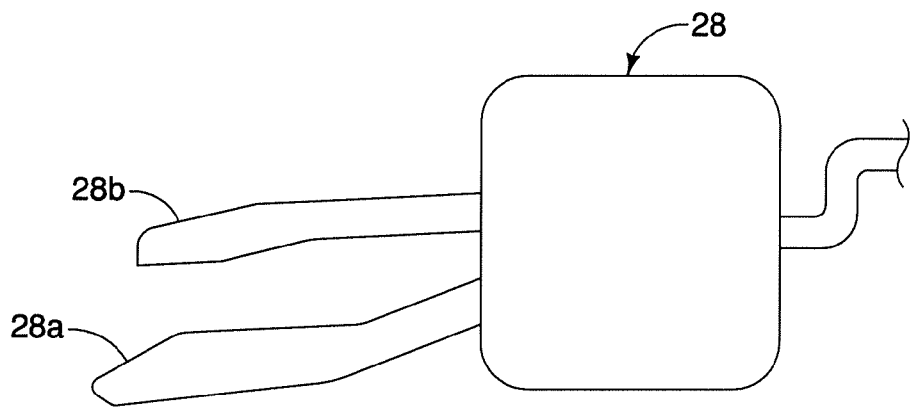
FIG. 28 is a simplified top plan view of a user operating switch or device for the telescoping seatpost part illustrated in FIGS. 1 to 25 in a rest position.
Figure 29:
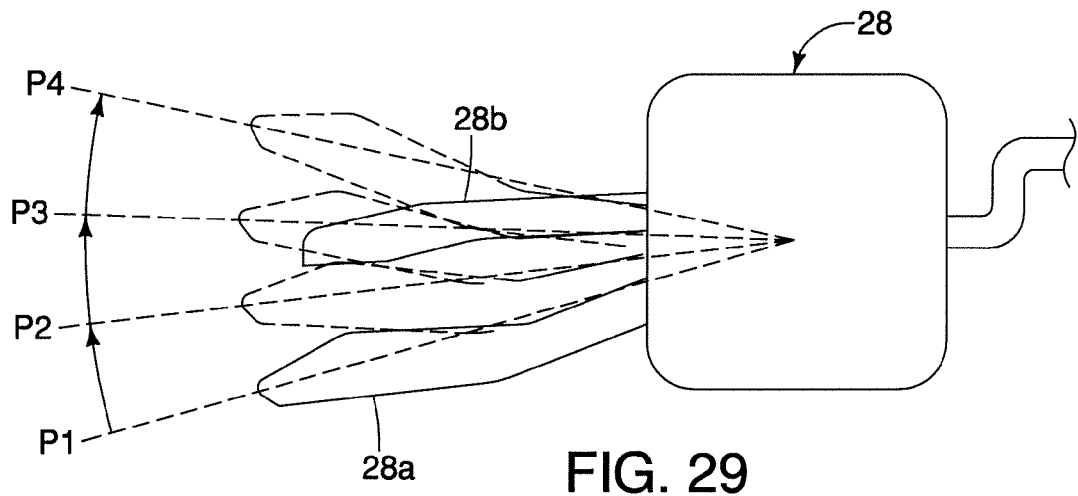
FIG. 29 is a simplified top plan view of the user operating switch illustrated in FIG. 28 showing movement of the raising actuation lever between four different preset actuation positions that correspond to the preset seat positions.
Figure 30:
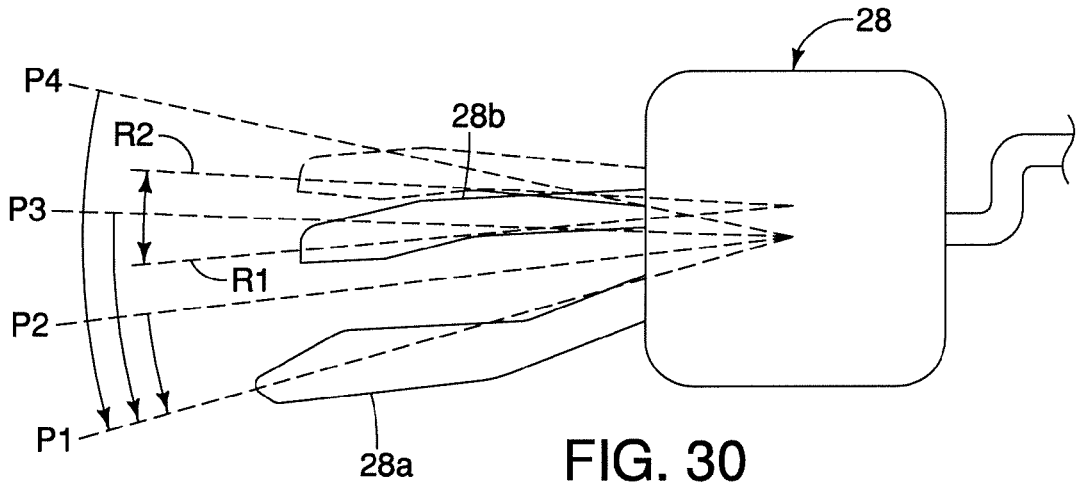
FIG. 30 is a simplified top plan view of the user operating switch illustrated in FIGS. 28 and 29 showing movement of the lowering actuation lever for releasing the raising actuation lever for movement between four different preset actuation positions that correspond to the preset seat positions.

As seen in FIGS. 28 to 30, the operating switch 28 is provided with a first operating lever 28a for raising the seat 13 with respect to the seat tube 18, and a second operating lever 28b for lowering the seat 13 with respect to the seat tube 18. The first operating lever 28a is pivotally mounted to the switch housing about a first pivot axis. The first operating lever 28a has four preset switch positions that correspond to the preset seatpost positions such as seen in FIG. 27. The first operating lever 28a is biased in a counterclockwise direction to a first switch position P1 that corresponds to the bottom preset seatpost position. A position mechanism (not shown) is provided for holding the first operating lever 28a in the second to fourth switch positions P2, P3 and P4. The position mechanism can be any type of mechanism as need and/or desired. For example, the position mechanism can be the same as one of the position mechanisms that are used in shifters such as manufactured by Shimano Inc. The second operating lever 28b is pivotally mounted to the switch housing about a second pivot axis that is offset from the first pivot axis of the first operating lever 28a. The second operating lever 28b is a trigger type lever that is movable from a rest position R1 to a releasing position R2, with a spring (not shown) biasing the second operating lever 28b to the rest position R1. In other words, when the second operating lever 28b is moved from the rest position R1 to a releasing position R2, the second operating lever 28b automatically moves back to the rest position R1 upon releasing the second operating lever 28b.

When the first operating lever 28a (FIG. 25) of the operating switch 28 is moved in a clockwise direction, the operating switch 28 outputs a motor control signal based on the position of the first operating lever 28a that extends the inner tube 20 with respect to the outer tube 22 for raising the seat 13 with respect to the seat tube 18. On the other hand, when the second operating lever 28b of the operating switch 28 is moved in a counter clockwise direction, the first operating lever 28a is released and moves in a counter clockwise direction such that the operating switch 28 outputs a motor control signal based on the position of the first operating lever 28a that retracts the inner tube 20 with respect to the outer tube 22 for raising the seat 13 with respect to the seat tube 18. As seen in FIG. 30, in the illustrated embodiment, when the second operating lever 28b is moved from the rest position R1 to the releasing position R2, the first operating lever 28a is moved directly to the first switch position P1 that corresponds to the bottom preset seatpost position. Of course, it will be apparent to those skilled in the art from this disclosure that other types of operating switches can be used as needed and/or desired. For example, a single friction type lever can be used in place of the operating switch 28. Alternatively, an operating switch with an up button and a down button can be used in place of the operating switch 28. In these two alternatives for the operating switch 28, the lowering of the seat 13 can be done one step at a time instead of the seat 13 being moved directly and immediately to the bottom preset seatpost position.

Figure 26:
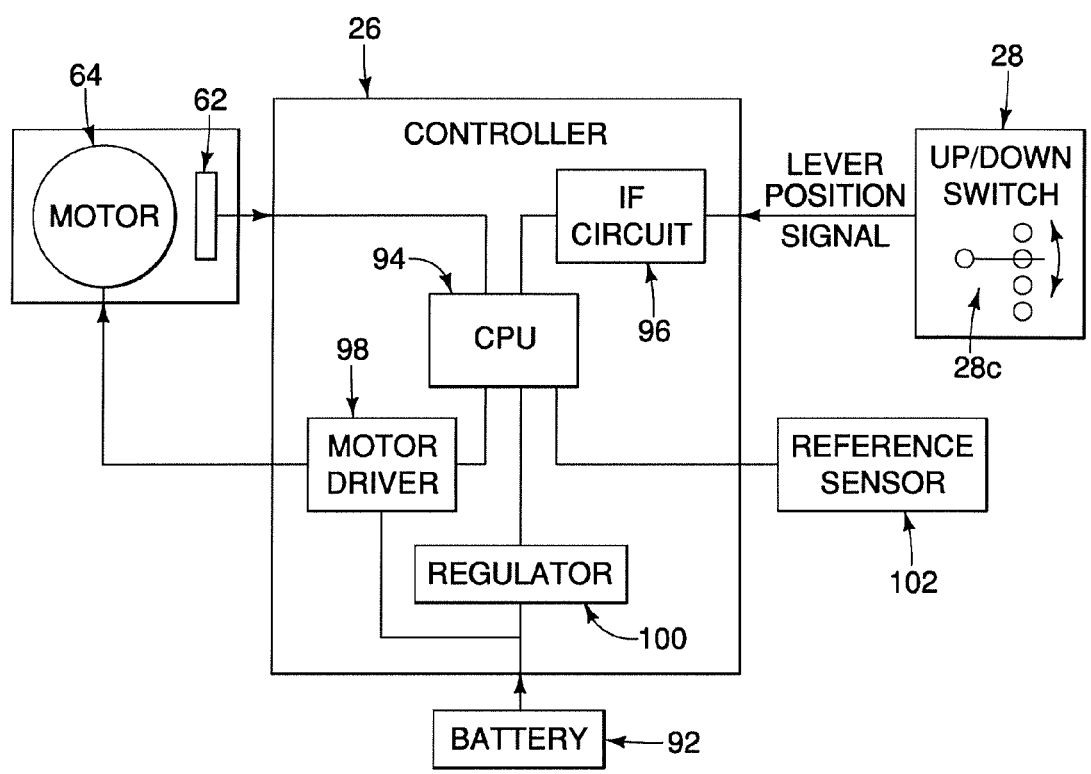
FIG. 26 is a schematic electrical diagram for the telescoping seatpost part illustrated in FIGS. 1 to 25.

Referring now to FIG. 26, basically, the motor 64 receives electrical power (electricity) from a battery 92 via the controller 26. In particular, the battery 92 is electrically connected to the motor 64 via the controller 26. The motor 64 is operatively connected to the linear movement mechanism 70 to selectively extend or retract the inner tube 20 relative to the outer tube 22. The controller 26 is operatively connected to the motor 64 with the controller 26 having four different preset seat position settings that selectively operate the motor 64 to move the inner tube 20 relative to the outer tube 22. In this illustrated embodiment, the controller 26 includes among other things, a central processing unit or CPU 94, an intermediate frequency (IF) circuit 96, a motor driver 98 and a regulator 100. The controller 26 is powered by the battery 92 that is mounted completely within the inner tube 20.

The central processing unit 94 preferably includes a microcomputer. The central processing unit 94 can also include other conventional components such as an input interface circuit, an output interface circuit, and storage devices such as a ROM (Read Only Memory) device and a RAM (Random Access Memory) device. The intermediate frequency (IF) circuit 96, the motor driver 98 and the regulator 100 are conventional components that are well known in the field. Thus, the components 96, 98 and 100 will not be discussed in detail herein.

As seen in FIG. 7, a magnet sensor 102 is mounted on the tubular housing 76, while a magnet 104 is mounted to the plate 90. The magnet sensor 102 and the magnet 104 constitute a position detecting device. The magnet sensor 102 detects a relative position between the inner and outer tubes 20 and 22. Thus, the magnet sensor 102 detects the magnet 104 when the screw nut 74 is at a reference position as seen in FIG. 7. In this illustrated embodiment, the reference position corresponds to the bottom preset seatpost position. The magnet sensor 102 is operatively connected to the controller 26 such that magnet sensor 102 provides a control signal to the controller 26 when the magnet sensor 102 detects magnet 104.

The operating switch 28 is operatively connected to the controller 26, and thus operatively connected to the motor 64. The operating switch 28 generates a motor control signal to operate the motor 64 in response to operation of the operating switch 28. The electrical power from the battery 92 is supplied to the operating switch 28 via the controller 26 for generating the motor control signals.

Figure 31:
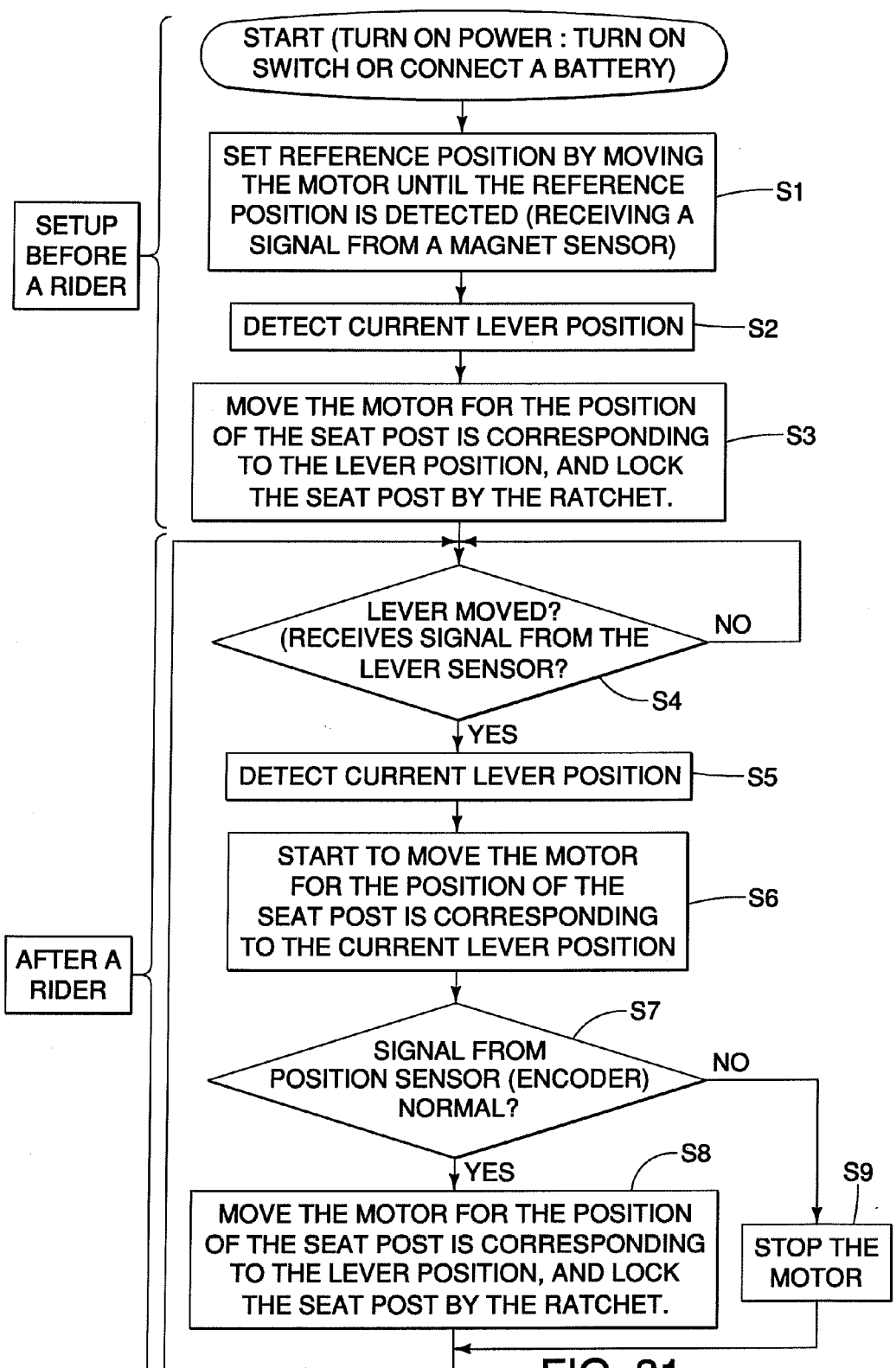
FIG. 31 is a flow chart showing a program executed by the controller of the telescoping seatpost part for controlling the raising and lowering of the seat between the different preset seat positions.

Referring now to FIG. 31, when the height adjustable seatpost assembly 12 is turned "on" or power is otherwise supplied to the controller 26, the program depicted by the flow chart of FIG. 31 is executed by the controller 26. Before the rider uses the height adjustable seatpost assembly 12, an initiation sequence is executed.

First in step S1, the controller 26 operates the motor 46 until the magnet sensor 102 detects the magnet 104 such that the screw nut 74 moves to the reference position as seen in FIG. 7. In this way, the controller 26 sets the reference position based on a signal received from the magnet sensor 102. In the illustrated embodiment, the reference position that corresponds to one of the preset seatpost positions. In particular, the controller 26 operates the motor 64 until the magnet sensor 102 detects the magnet 104 that is effectively attached to the screw nut 74 by the plate 90. Upon reaching the reference position (e.g., the bottom preset seatpost position), the controller 26 then proceeds to step S2.

In step S2, the controller 26 determines the current lever position of the first operating lever 28a based on a signal from a lever sensor 28c (see FIG. 26) of the operating switch 28. The lever sensor 28c detects the current lever position of the first operating lever 28a and outputs a signal to the controller 26 that is indicative of the current lever position of the first operating lever 28a. Upon determining the current lever position of the first operating lever 28a, the controller 26 then proceeds to step S3.

In step S3, the controller 26 drives the motor 64 until the seat 13 reaches the preset seat position that corresponds to the current lever position of the first operating lever 28a based on a signal from the rotary encoder 62. Upon reaching the preset seat position that corresponds to the current lever position of the first operating lever 28a, the controller 26 then drives the motor 64 to lock the telescoping seatpost part 14 in place and unload the drive screw 72.

Next, in step S4, the controller 26 waits for a signal from the lever sensor 28c of the operating switch 28 indicating that the rider operated one of the operating levers 28a and 28b such that the lever position of the first operating lever 28a has changed. In particular, in step S4, once the controller 26 receives a signal from the lever sensor 28c of the operating switch 28 indicating that the rider operated one of the operating levers 28a and 28b, the controller 26 proceeds to step S5.

In step S5, the controller 26 determines the current lever position based on the signal from the lever sensor 28c of the operating switch 28. Upon determining the new lever position of the first operating lever 28a, the controller 26 then proceeds to step S6.

In step S6, the controller 26 drives the motor 64 until the seat 13 reaches the preset seat position that corresponds to the current lever position based on a signal from the rotary encoder 62. In the illustrated embodiment, the prescribed tooth pitch or axial distance D1 is preferably 5.0 mm, with each of the preset seat positions being preferably a multiple number of the prescribed tooth pitch or axial distance D1. However, for the sake of simplicity of illustration, the expansion and retraction operations shown in FIGS. 8 to 24, only illustrate changing the overall length of the telescoping seatpost part 14 by a single tooth position in each direction. In the case of an expansion operation (i.e., raising the inner tube 20 with respect to the outer tube 22) of the telescoping seatpost part 14, the controller 26 drives the motor 64 as seen in FIGS. 8 to 16. In the case of an expansion operation (i.e., raising the inner tube 20 with respect to the outer tube 22) of the telescoping seatpost part 14, the controller 26 drives the motor 64 as seen in FIGS. 8 to 16. In the case of a retraction operation (i.e., lowering the inner tube 20 with respect to the outer tube 22) of the telescoping seatpost part, the controller 26 drives the motor 64 as seen in FIGS. 17 to 24.

Figure 15:
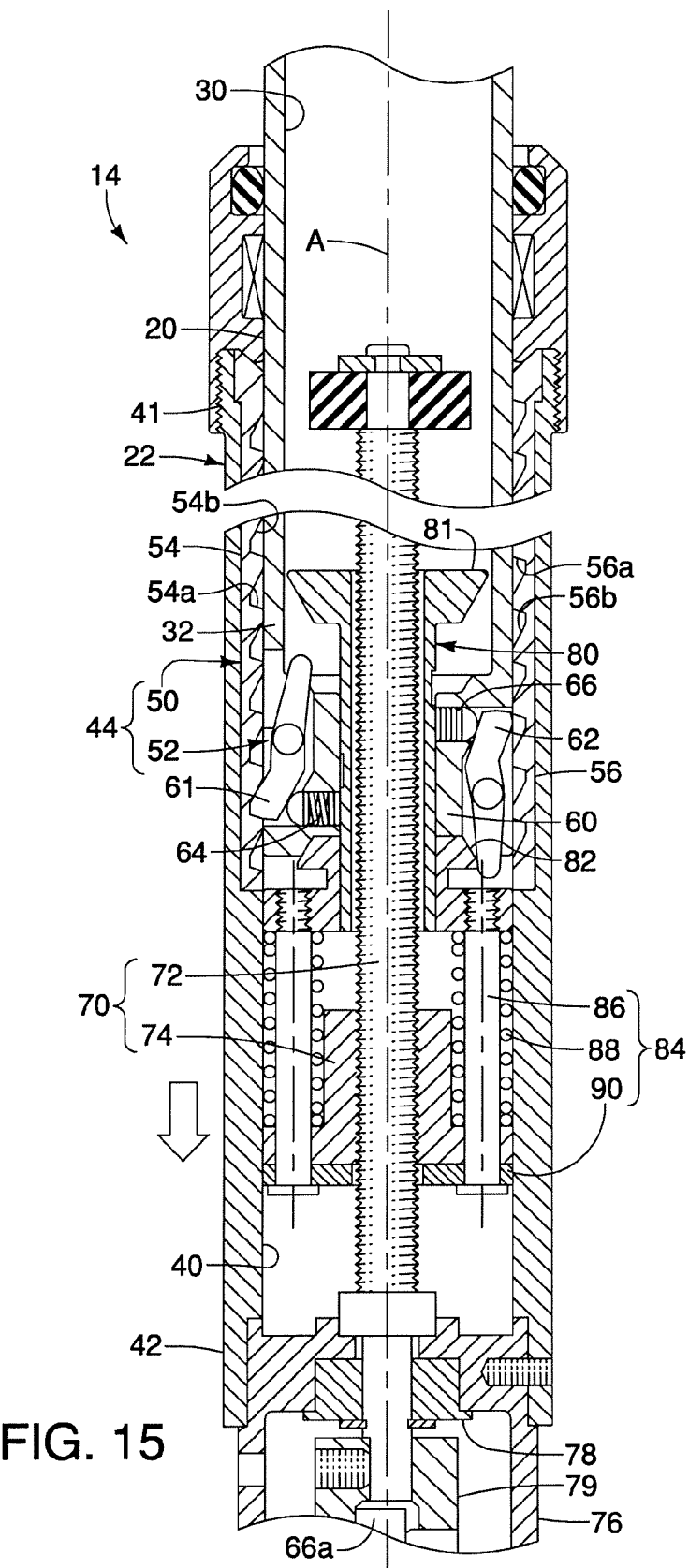
FIG. 15 is a longitudinal cross sectional view of a portion of the telescoping seatpost part corresponding to the seventh drawing of FIG. 8 showing the screw nut and the pawl release structure moving downward from FIG. 14 to the preset seat position such that the downward movement stop pawl members fully engage the next higher teeth of the ratchet tooth structure and the upward movement stop pawl members are in position to engage the next higher teeth of the ratchet tooth structure.
Figure 16:
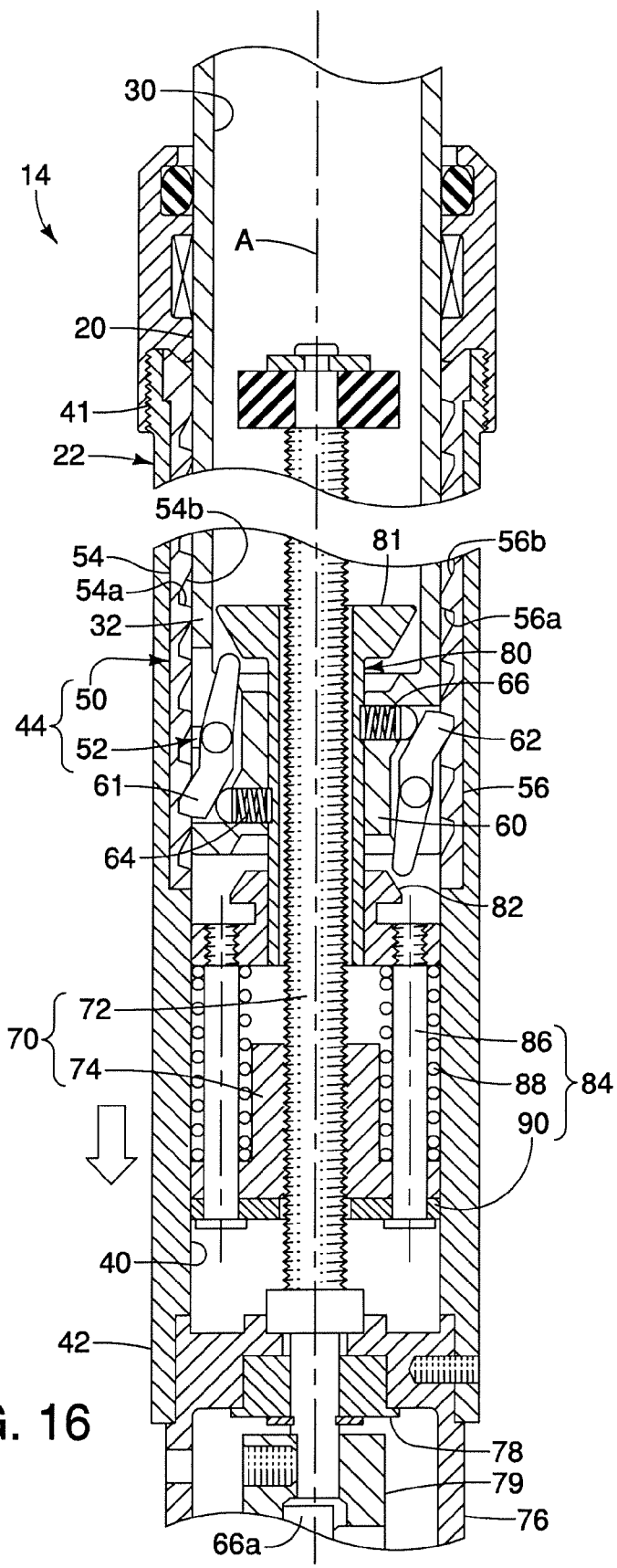
FIG. 16 is a longitudinal cross sectional view of a portion of the telescoping seatpost part corresponding to the last (eighth) drawing of FIG. 8 showing an ending seat position of the expansion operation illustrated in FIG. 8 in which the downward and upward movement stop pawl members lock the inner (upper) tube to the outer (lower) tube with the drive source being unloaded.
Figure 17:
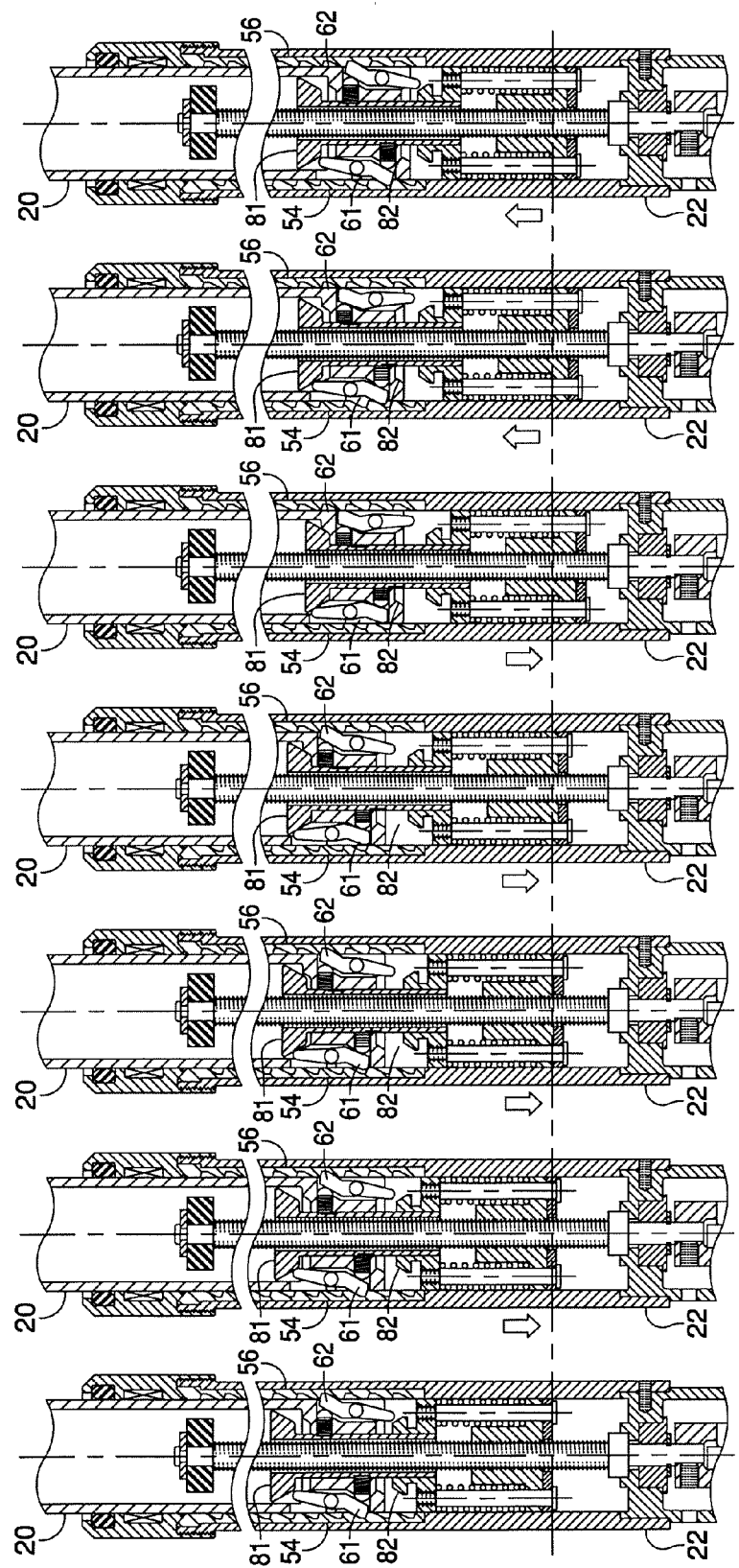
FIG. 17 is a series of longitudinal cross sectional views of a portion of the telescoping seatpost part as seen along section line 4-A-5 of FIG. 3 showing a retraction operation of the inner (upper) tube with respect to the outer (lower) tube, with the left half of the cross section of the telescoping seatpost part corresponding to the cross section illustrated in FIG. 4 and the right half of the cross section of the telescoping seatpost part corresponding to the cross section illustrated in FIG. 5.
Figure 18:
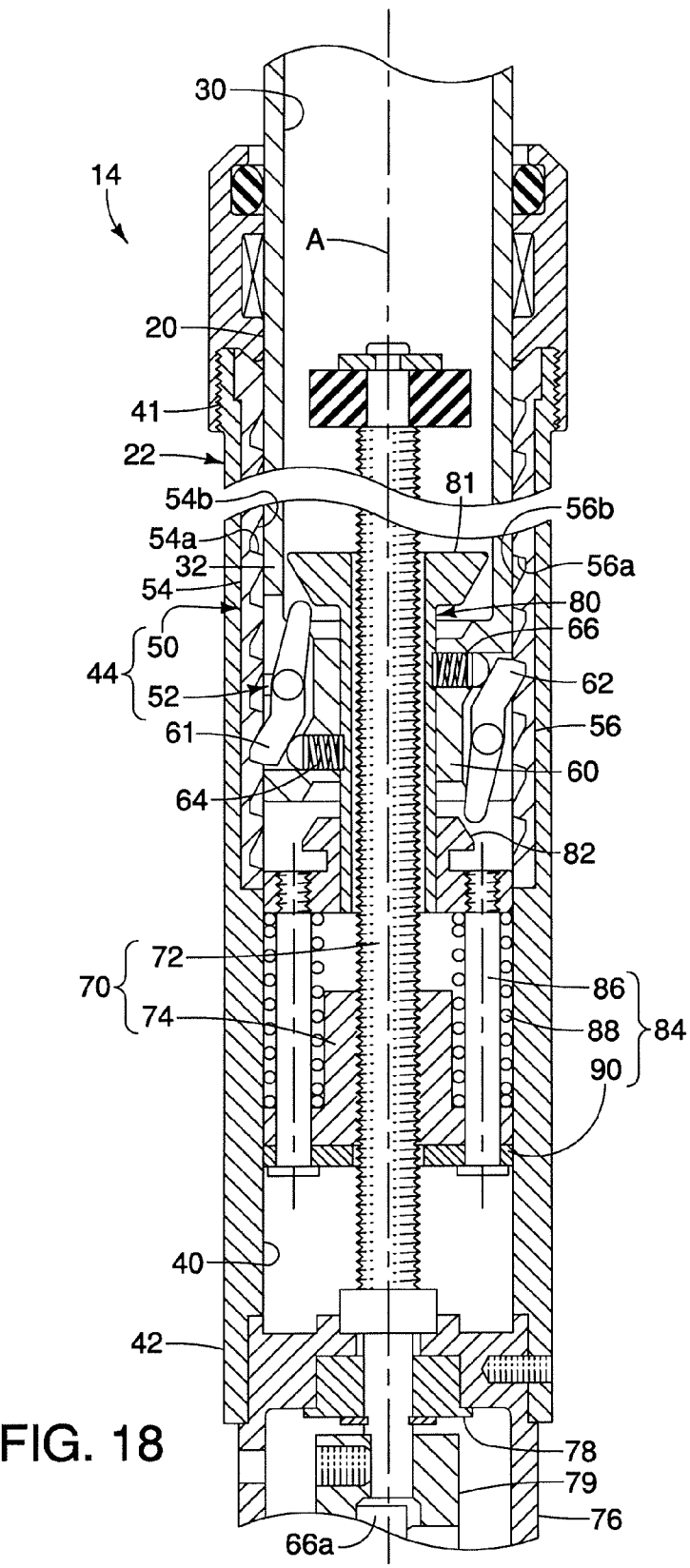
FIG. 18 is a longitudinal cross sectional view of a portion of the telescoping seatpost part corresponding to the first drawing of FIG. 17 showing a starting seat position of the retraction operation illustrated in FIG. 17.
Figure 19:
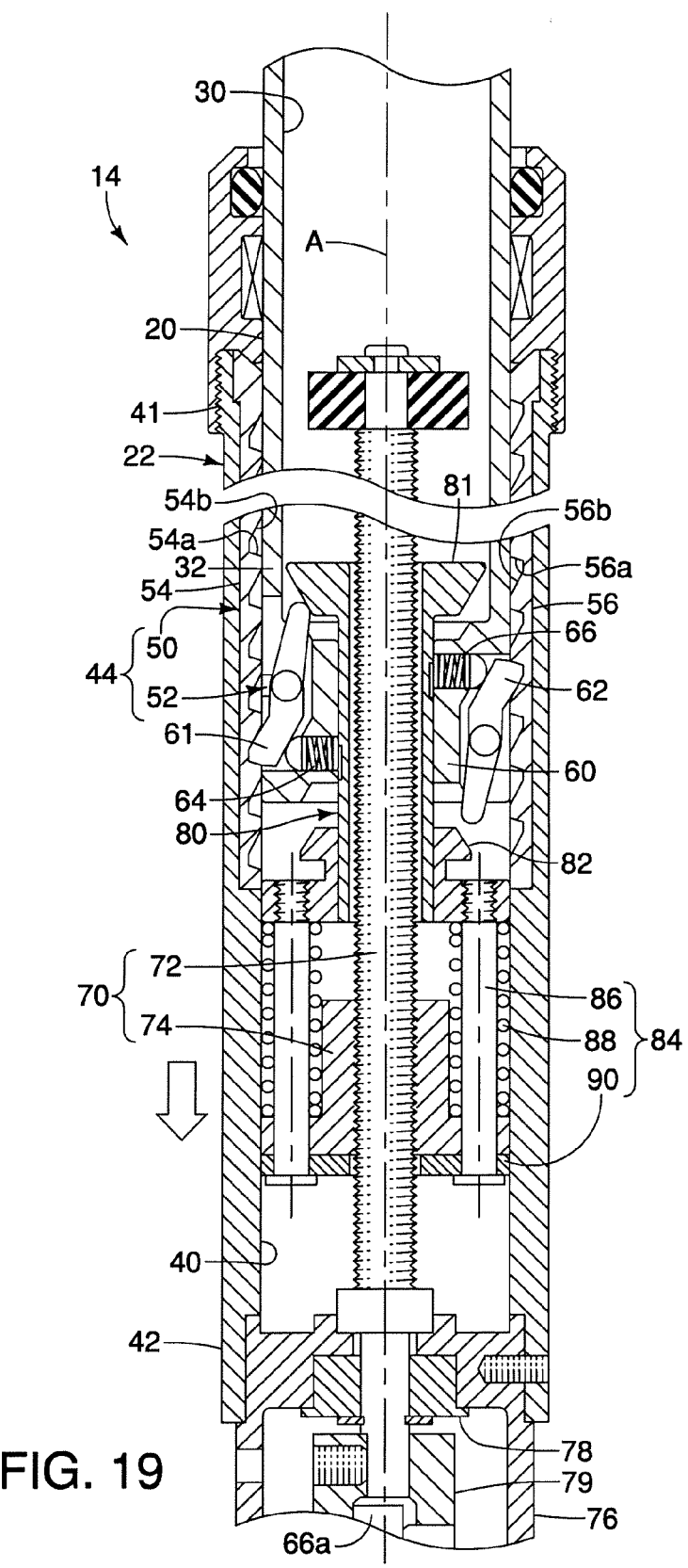
FIG. 19 is a longitudinal cross sectional view of a portion of the telescoping seatpost part corresponding to the second drawing of FIG. 17 showing the screw nut and the pawl release structure moving downward from FIG. 18 such that the upper cam portion contacts the downward movement stop pawl members.
Figure 20:
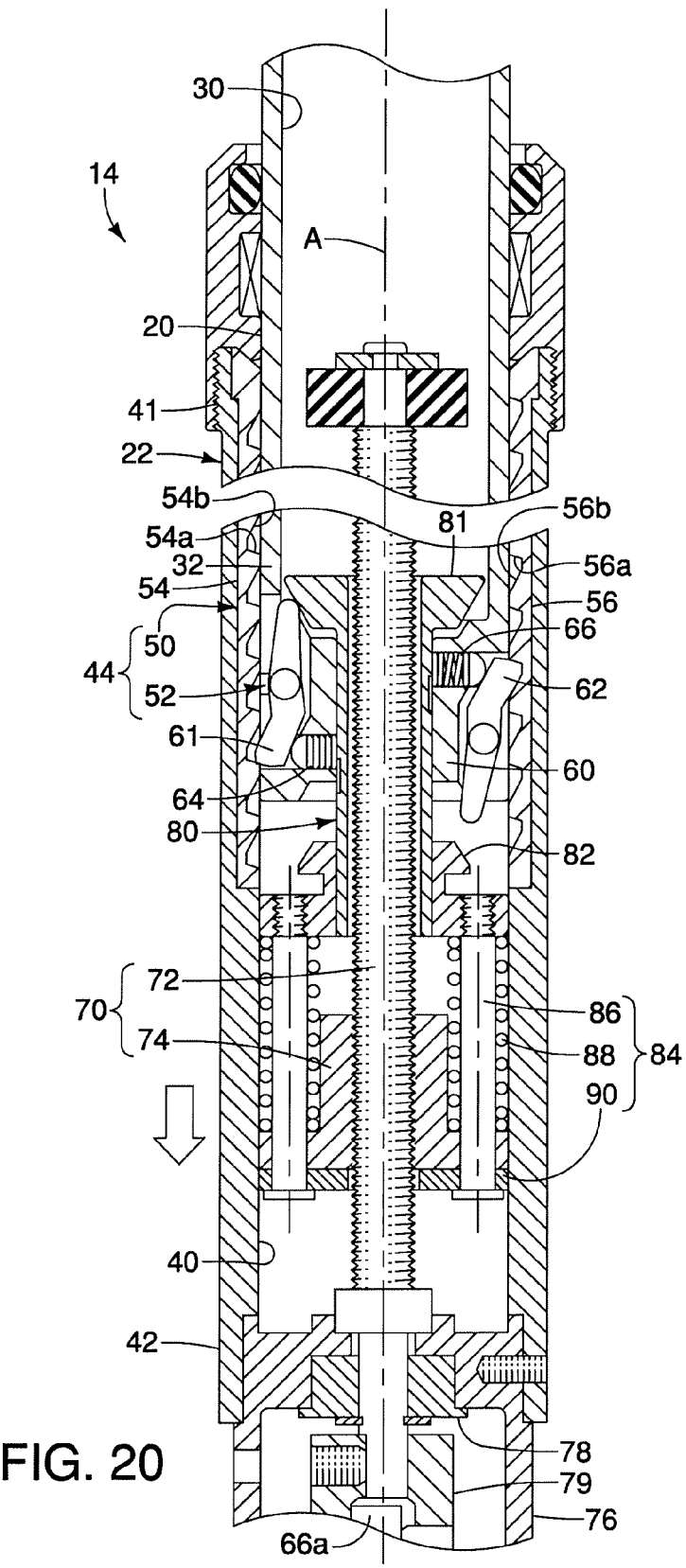
FIG. 20 is a longitudinal cross sectional view of a portion of the telescoping seatpost part corresponding to the third drawing of FIG. 17 showing the screw nut and the pawl release structure moving farther downward from FIG. 19 such that the upper cam portion starts pivoting the downward movement stop pawl members out of engagement from the teeth of the ratchet tooth structure before moving the inner (upper) tube relative to the outer (lower) tube.
Figure 21:
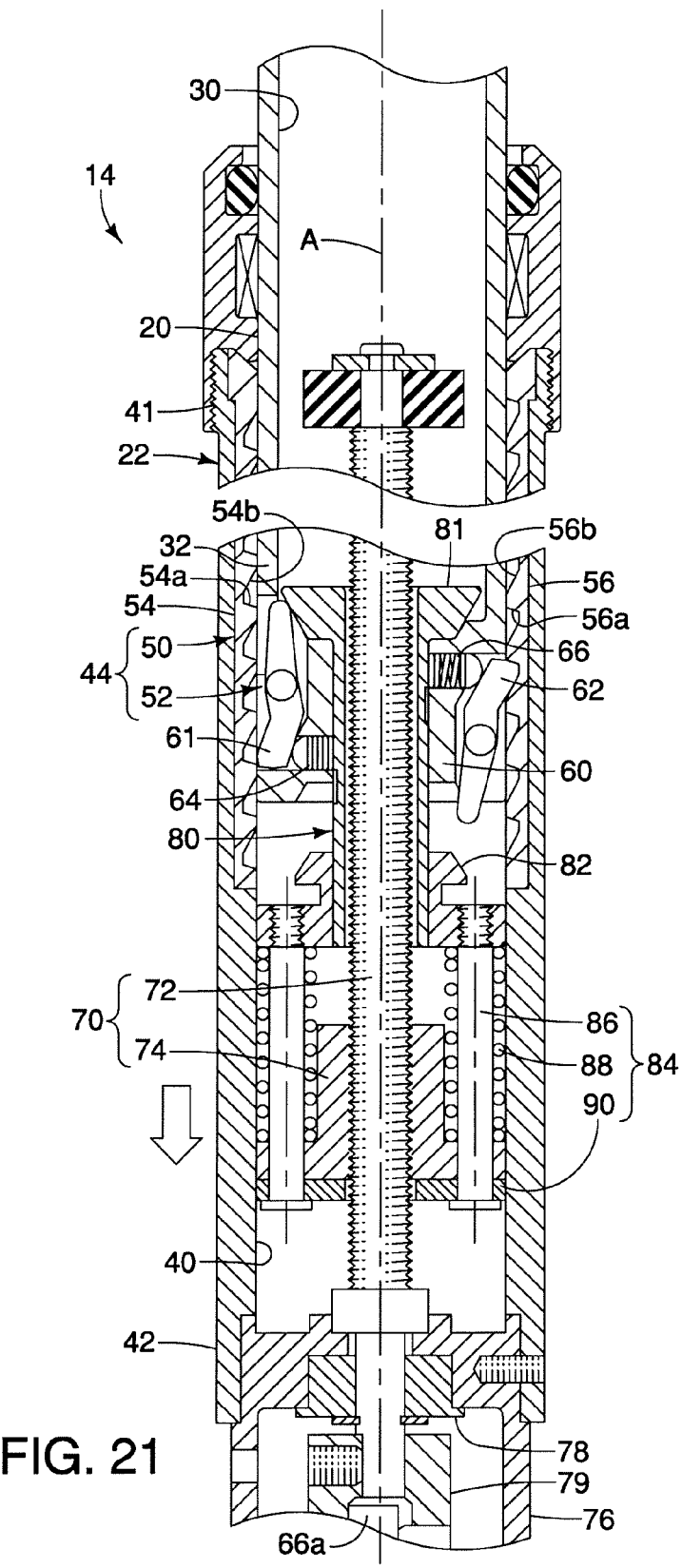
FIG. 21 is a longitudinal cross sectional view of a portion of the telescoping seatpost part corresponding to the fourth drawing of FIG. 17 showing the screw nut and the pawl release structure moving farther downward from FIG. 20 such that the downward movement stop pawl members are moved completely out of engagement from the teeth of the ratchet tooth structure by the upper cam portion before moving the inner (upper) tube relative to the outer (lower) tube.

During an expansion operation, the controller 26 drives the motor 64 so that the drive screw 72 rotates to axially move the screw nut 74 in an upward direction. In particular, the screw nut 74 and the pawl release structure 80 initially move together as a unit upward from the rest (starting) position shown in FIG. 9 to an intermediate position (e.g., upward by 1 mm from the starting position) shown in FIG. 10, such that the lower cam portion 82 of the pawl release structure 80 contacts the second stop pawl members 62. Further upward movement of the screw nut 74 and the pawl release structure 80 from the position shown in FIG. 10 to an intermediate position (e.g., upward by 2.1 mm from the starting position) shown in FIG. 11 results in the lower cam portion 82 of the pawl release structure 80 starting to pivot the second stop pawl members 62 out of engagement from the second ratchet teeth 56 of the ratchet tooth structure 50 before moving the inner tube 20 relative to the outer tube 22. Further upward movement of the screw nut 74 and the pawl release structure 80 from the position shown in FIG. 11 to an intermediate position (e.g., upward by 3.5 mm from the starting position) shown in FIG. 12 results in the lower cam portion 82 of the pawl release structure 80 pivoting the second stop pawl members 62 completely out of engagement from the second ratchet teeth 56 of the ratchet tooth structure 50 before moving the inner tube 20 relative to the outer tube 22. Further upward movement of the screw nut 74 and the pawl release structure 80 from the position shown in FIG. 12 to an intermediate position (e.g., upward by 7 mm from the starting position) shown in FIG. 13 results in the lower cam portion 82 of the pawl release structure 80 moving the pawl holder 60 and the inner tube 20 upward as a unit relative to the outer tube 22. Further upward movement of the screw nut 74 and the pawl release structure 80 from the position shown in FIG. 13 to an intermediate position (e.g., upward by 9 mm from the starting position) shown in FIG. 14 results in the pawl holder 60 being moved to slightly higher than the next seat position such that the first stop pawl members 61 engage the next higher one of the first ratchet teeth 54 of the ratchet tooth structure 50 and the second stop pawl members 62 are contacting areas between two teeth of the ratchet tooth structure 50. During this upward movement of the screw nut 74 and the pawl release structure 80 from the position shown in FIG. 13 to the intermediate position shown in FIG. 14, the first stop pawl members 61 were ratcheted upward against the cam surface 54b of one of the first ratchet teeth 54 of the ratchet tooth structure 50. Next, as shown in FIG. 15, the controller 26 drives the motor 64 in the opposite direction so that the drive screw 72 rotates to axially move the screw nut 74 in a downward direction. In particular, the downward movement of the screw nut 74 and the pawl release structure 80 from the position shown in FIG. 14 to an intermediate position (e.g., upward by 8.4 mm from the starting position) shown in FIG. 15 results in the first stop pawl members 61 fully engage the next higher one of the pawl abutments 54a of the first ratchet teeth 54 of the ratchet tooth structure 50 and the second stop pawl members 62 being located adjacent the next higher one of the pawl abutments 546a of the second ratchet teeth 56. Finally, further downward movement of the screw nut 74 and the pawl release structure 80 from the position shown in FIG. 15 to an intermediate position (e.g., upward by 5 mm from the starting position) shown in FIG. 16 results in the ending seat position of the expansion operation in which the first and second movement stop pawl members 61 and 62 engage the first and second ratchet teeth 54 and 56 to lock the inner tube 20 to the outer tube 22 with the drive screw 72 and the screw nut 74 of the drive source 46 being unloaded. While the expansion operation illustrated in FIGS. 8 to 16 shows only the inner tube 20 being raised by the prescribed tooth pitch or axial distance D1 between two adjacent ones of the pawl abutments 54a, preferably, an expansion operation raises the inner tube 20 by a distance corresponding to several of the pawl abutments 54a of the first ratchet teeth 54.

Figure 22:
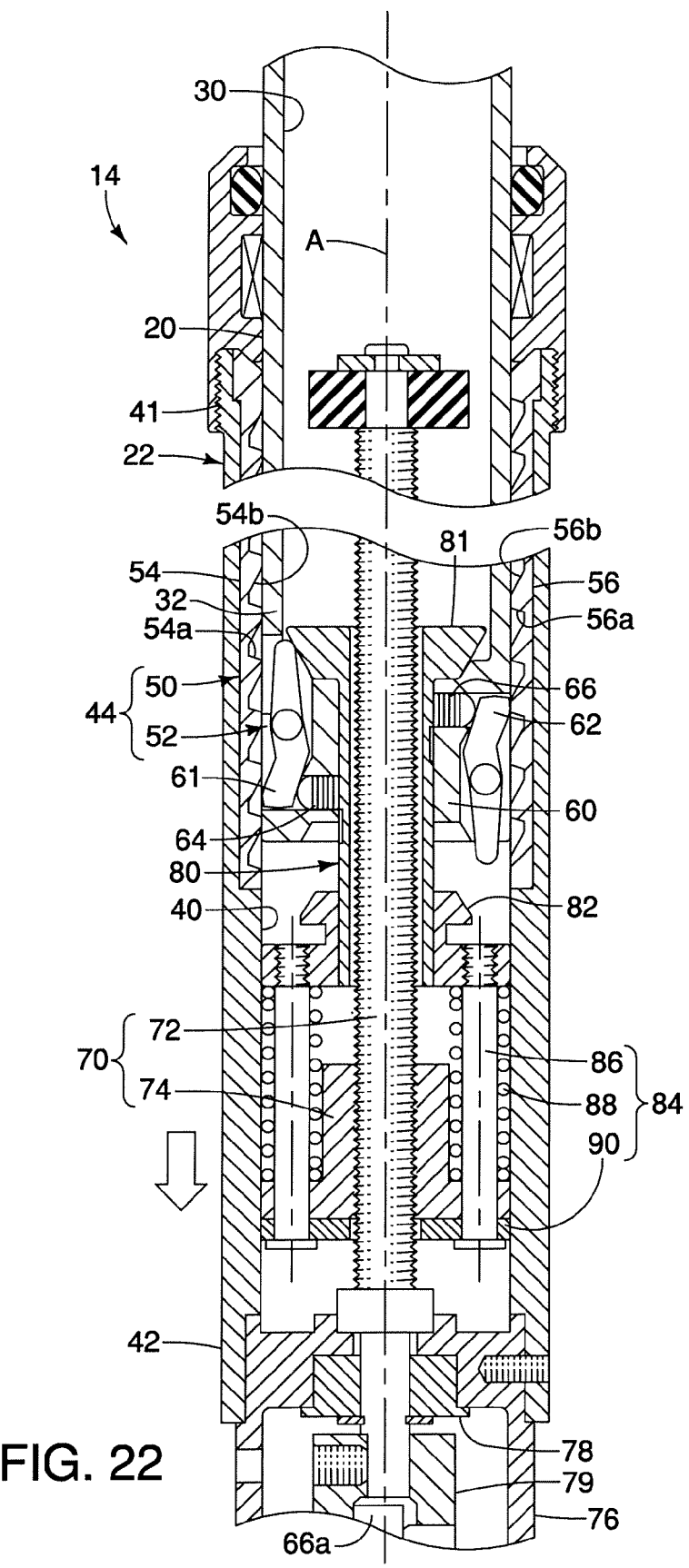
FIG. 22 is a longitudinal cross sectional view of a portion of the telescoping seatpost part corresponding to the fifth drawing of FIG. 17 showing the screw nut and the pawl release structure moving farther downward from FIG. 21 such that the upper cam portion moves the ratchet tooth structure and the inner (upper) tube downward as a unit relative to the outer (lower) tube with the downward movement stop pawl members being in position to engage the next lower teeth of the ratchet tooth structure while the upward movement stop pawl members are contacting areas between two of the teeth of the ratchet tooth structure.
Figure 23:
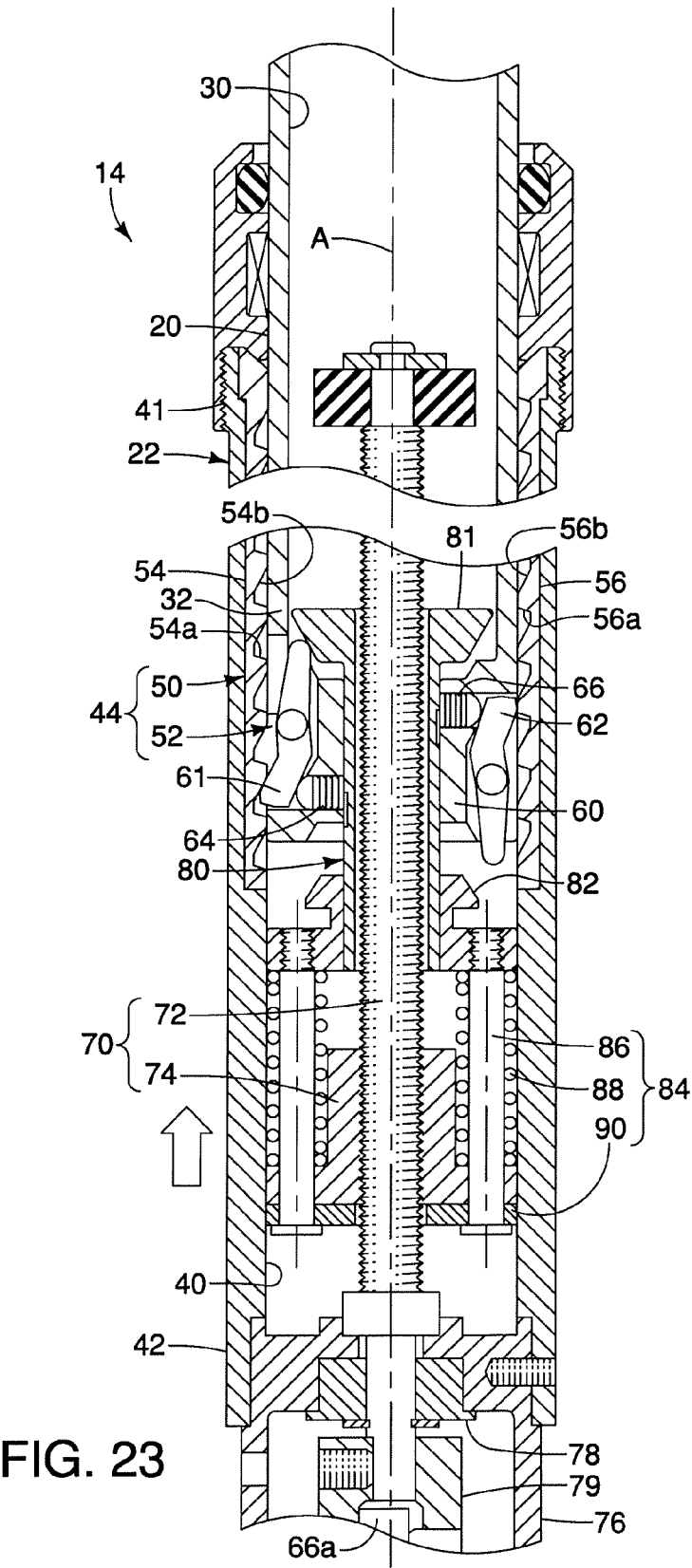
FIG. 23 is a longitudinal cross sectional view of a portion of the telescoping seatpost part corresponding to the sixth drawing of FIG. 17 showing the screw nut and the pawl release structure starting to move upward from FIG. 22 such that the upper cam portion starts separating from the downward movement stop pawl members with the upward movement stop pawl members contacting an area between two of the ratchet teeth.
Figure 24:
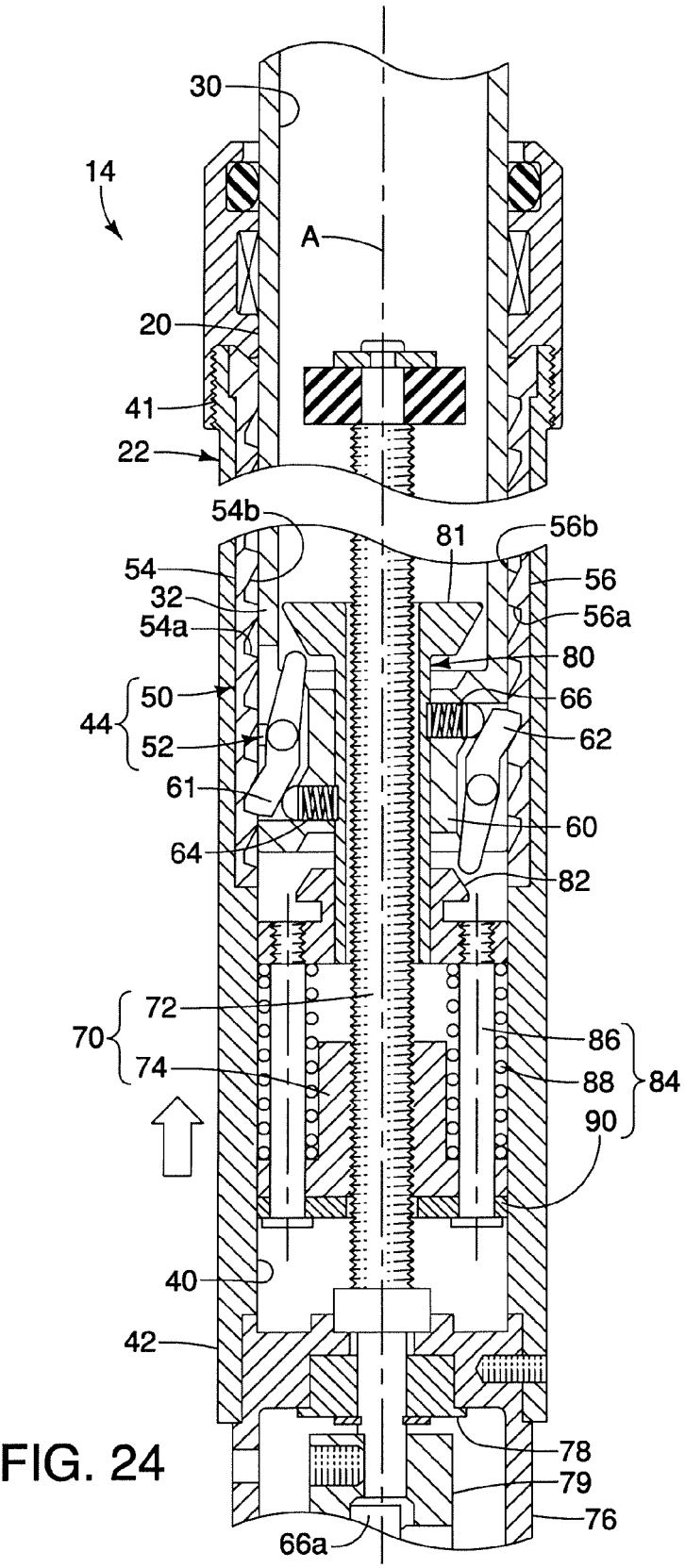
FIG. 24 is a longitudinal cross sectional view of a portion of the telescoping seatpost part corresponding to the last (seventh) drawing of FIG. 17 showing an ending seat position of the retraction operation illustrated in FIG. 17 in which the downward and upward movement stop pawl members lock the inner (upper) tube to the outer (lower) tube with the drive source being unloaded.

During a retraction operation, the controller 26 drives the motor 64 so that the drive screw 72 rotates to axially move the screw nut 74 in a downward direction. In particular, the screw nut 74 and the pawl release structure 80 initially move together as a unit downward from the rest (starting) position shown in FIG. 18 to an intermediate position (e.g., downward by 1 mm from the starting position) shown in FIG. 19, such that the upper cam portion 81 of the pawl release structure 80 contacts the first stop pawl members 61. Further downward movement of the screw nut 74 and the pawl release structure 80 from the position shown in FIG. 19 to an intermediate position (e.g., downward by 2.1 mm from the starting position) shown in FIG. 20 results in the upper cam portion 81 of the pawl release structure 80 starting to pivot the first stop pawl members 61 out of engagement from the first ratchet teeth 54 of the ratchet tooth structure 50 before moving the inner tube 20 relative to the outer tube 22. Further downward movement of the screw nut 74 and the pawl release structure 80 from the position shown in FIG. 20 to an intermediate position (e.g., upward by 3.4 mm from the starting position) shown in FIG. 21 results in the upper cam portion 81 of the pawl release structure 80 pivoting the first stop pawl members 61 completely out of engagement from the first ratchet teeth 54 of the ratchet tooth structure 50 before moving the inner tube 20 relative to the outer tube 22. Further downward movement of the screw nut 74 and the pawl release structure 80 from the position shown in FIG. 21 to an intermediate position (e.g., upward by 7 mm from the starting position) shown in FIG. 22 results in the upper cam portion 81 of the pawl release structure 80 moving the pawl holder 60 and the inner tube 20 downward as a unit relative to the outer tube 22 such that the first stop pawl members 61 are in position to engage the next lower one of the first ratchet teeth 54 of the ratchet tooth structure 50 while the second stop pawl members 62 are contacting areas between two of the second ratchet teeth 56 of the ratchet tooth structure 50. During this downward movement of the screw nut 74 and the pawl release structure 80 from the position shown in FIG. 21 to the intermediate position shown in FIG. 22, the second stop pawl members 62 were ratcheted upward against the cam surface 56b of one of the second ratchet teeth 56 of the ratchet tooth structure 50. Next, as shown in FIG. 22, the controller 26 drives the motor 64 in the opposite direction so that the drive screw 72 rotates to axially move the screw nut 74 in an upward direction. In particular, the upward movement of the screw nut 74 and the pawl release structure 80 from the position shown in FIG. 22 to an intermediate position (e.g., downward by 5 mm from the starting position) shown in FIG. 23 results in the upper cam portion 81 of the pawl release structure 80 starting to separate from the first stop pawl members 61 which are pushed to engage the first ratchet teeth 54 of the ratchet tooth structure 50 with the second stop pawl members 62 contacting an area between two of the second ratchet teeth 56. Finally, the screw nut 74 and the pawl release structure 80 from the position shown in FIG. 23 to the final position (e.g., downward by 5 mm from the starting position) shown in FIG. 24 results in the ending seat position of the retraction operation in which the first and second movement stop pawl members 61 and 62 engage the first and second ratchet teeth 54 and 56 to lock the inner tube 20 to the outer tube 22 with the drive screw 72 and the screw nut 74 of the drive source 46 being unloaded. While the retraction operation illustrated in FIGS. 17 to 24 shows only the inner tube 20 being lowered by the prescribed tooth pitch or axial distance D1 between two adjacent ones of the pawl abutments 54a, preferably, an retraction operation lowers the inner tube 20 by a distance corresponding to several of the pawl abutments 54a of the first ratchet teeth 54.

In step S7, while the controller 26 drives the motor 64 to the preset seat position that corresponds to the current lever position of the first operating lever 28a, the controller 26 monitors the signal from the rotary encoder 62 to make sure that the motor 64 is operating normally. If the motor 64 is operating normally, then the controller 26 then proceeds to step S8. However, if the motor 64 is not operating normally, then the controller 26 then proceeds to step S9, where the motor 64 is stop and a warning signal (e.g., a light, and/or a sound) is outputted to the rider. The controller 26 determines if the motor 64 is not operating normally based on the signals from the rotary encoder 62 as the motor 64 is being operated. If the rotary encoder 62 detects that the motor 64 has stopped prior to reaching the preset seat position that corresponds to the current lever position of the first operating lever 28a, then the controller 26 determines the motor 64 is operating abnormally. Likewise, if the rotary encoder 62 detects that the motor 64 is rotating slower that a prescribed rotational speed, then the controller 26 determines the motor 64 is operating abnormally.

In step S8, the controller 26 drives the motor 64 to place the linear movement mechanism 70 in the unloaded position and lock the telescoping seatpost part 14 in place. Now, the controller 26 returns step S4 where the controller 26 waits for a signal from the operating switch 28 that the rider operated one of the operating levers 28a and 28b.

Figure 32:
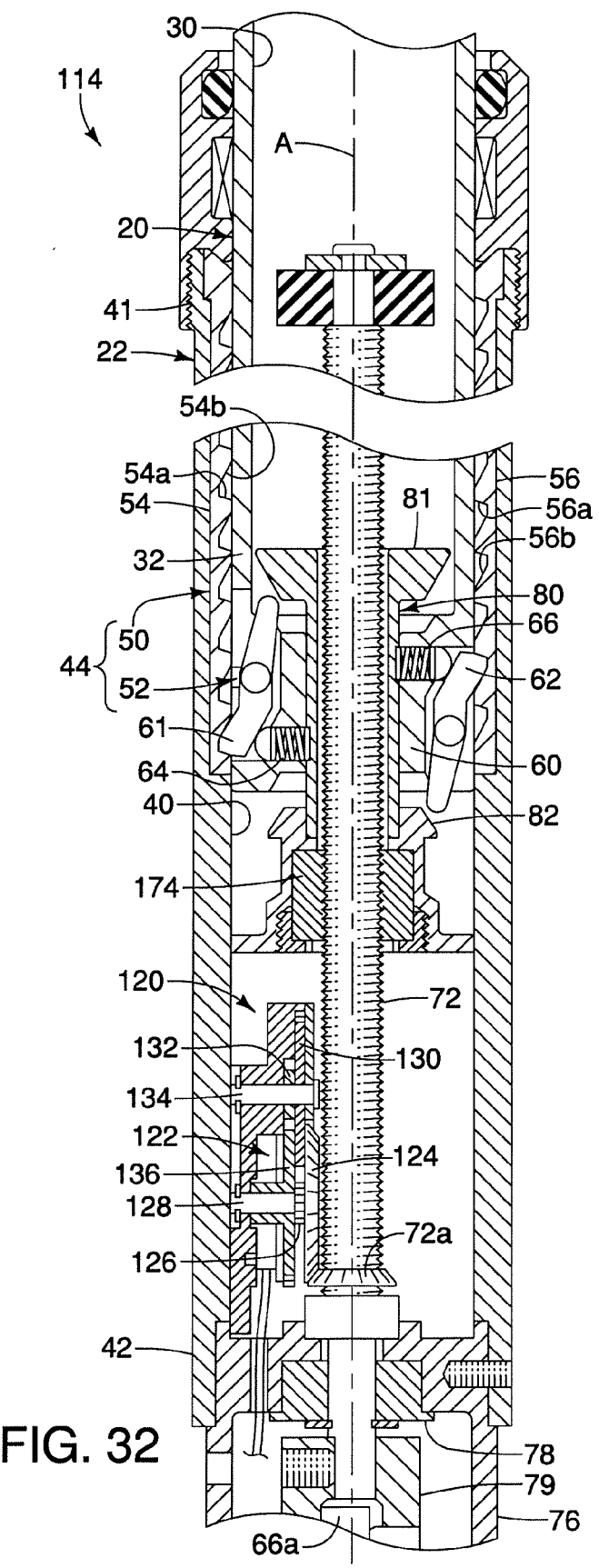
FIG. 32 is a longitudinal cross sectional view of a portion of the telescoping seatpost part showing an alternative position detecting device for sensing the height of the inner tube of the telescoping seatpost part with respect to the outer tube of the telescoping seatpost part.

Referring now to FIG. 32, a longitudinal cross sectional view of a lower portion of a telescoping seatpost part 114 is illustrated that shows an alternative position detecting device 120. The telescoping seatpost part 114 replaces the telescoping seatpost part 14 in the height adjustable seatpost assembly 12, and thus, the telescoping seatpost part 114 is used in the bicycle 10, illustrated in FIG. 1. Since the only difference between the telescoping seatpost part 114 and the telescoping seatpost part 14 is the use of the alternative position detecting device 120 and the modifications for removal of the position detecting device (the magnet sensor 102 and the magnet 104) and the saver mechanism 84, the same reference numerals will be used to identify the same parts. Moreover, the descriptions of the operation of the height adjustable seatpost assembly 12 applies to the telescoping seatpost part 114 of FIG. 32, with the exception of the position detecting device (the magnet sensor 102 and the magnet 104) and the saver mechanism 84, which have been removed from the telescoping seatpost part 114.

The position detecting device 120 is used to sense the height of the inner tube 20 of the telescoping seatpost part 14 with respect to the outer tube 22 of the telescoping seatpost part 14. Basically, the position detecting device 120 includes a rotary potentiometer 122 that is electrically connected to the controller 26 for providing a position signal that is indicative of the position of the inner tube 20 to with respect to the outer tube 22. Rotary potentiometers, such as the rotary potentiometer 122, are well known, and thus, the rotary potentiometer 122 will not be discussed and/or illustrated in detail.

The rotary potentiometer 122 is operatively connected to the drive screw 72 such that the rotation of the drive screw 72 rotates a rotatable input member (i.e., sensed part) of the rotary potentiometer 122 to sense the position of the inner tube 20 to with respect to the outer tube 22. In particular, in this illustrated embodiment, a bevel gear 72a is fixed to the lower end of the drive screw 72 for rotating a gearing arrangement that rotates the rotatable input member of the rotary potentiometer 122. The bevel gear 72a has a threaded interior bore that is engaged with the thread of the drive screw 72. The gearing arrangement includes a bevel gear 124 and a spur gear 126 that are fixed together for rotation with a support shaft 128. The gear teeth of the bevel gear 72a are engaged with the gear teeth of the bevel gear 124 for rotating the bevel gear 124 and the spur gear 126 together. The bevel gear 124 and the spur gear 126 change the power from straight-line motion to motion of rotation. The gear teeth of the spur gear 126 are engaged with the gear teeth of a spur gear 130. The spur gear 130 has a smaller spur gear 132 fixed to one side of the spur gear 130 such that the spur gears 130 and 132 rotate together as a unit on a support shaft 134. The gear teeth of the spur gear 132 are engaged with the gear teeth of a spur gear 136 that is rotatably mounted on the support shaft 128. The spur gears 126, 130, 132 and 136 form a gear reduction unit for providing a desired amount of angular rotation to the rotatable input member of the rotary potentiometer 122 for each rotation of the drive screw 72. The number of gears that form the gear reduction unit is not limited to the illustrated embodiment. In any event, the rotary potentiometer 122 detects a plurality of positions of rotatable input member of the rotary potentiometer 122 that corresponds to a plurality of predetermined heights of the inner tube 20 to with respect to the outer tube 22. As the screw pitch for the drive screw 72 and the screw nut 174 become larger, the screw nut 174 can more easily slide down on the drive screw 72 as a downward force is applied to the drive screw 72 such as when the rider sits on the seat 13. Therefore, in this embodiment, selection of a suitable screw pitch for the drive screw 72 and the screw nut 174 can avoid the need to use the saver mechanism 84.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the motorized bicycle seatpost assembly. Accordingly, these terms, as utilized to describe the present invention should be interpreted relative to a bicycle equipped with the motorized bicycle seatpost assembly as used in the normal riding position.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A height adjustable seatpost assembly comprising:
first and second tubes being telescopically arranged;
a ratchet mechanism including a ratchet tooth structure and a pawl structure, the pawl structure being engaged with the ratchet tooth structure in a lock position, and the pawl structure being movably coupled with respect to the ratchet tooth structure in a movable position such that the first and second tubes are movably arranged relative to each other in at least one axial direction of the first and second tubes; and
a drive source operatively connected to the pawl structure to move the pawl structure between the lock position and the movable position in response to operation of the drive source, the drive source further being operatively connected between the first and second tubes to axially move the first and second tubes relative to each other in response to operation of the drive source.

2. The height adjustable seatpost assembly according to claim 1, wherein
the drive source includes a linear movement mechanism having a drive screw and a screw nut, with the screw nut engaged with the drive screw such that the screw nut moves in an axial direction of the drive screw in response to relative rotational movement between the drive screw and the screw nut.

3. The height adjustable seatpost assembly according to claim 1, wherein
the drive source includes a pawl release structure that moves linearly within at least one of the first and second tubes such that the pawl release structure selectively moves the pawl structure between the lock position and the movable position.

4. The height adjustable seatpost assembly according to claim 3, wherein
the drive source includes a linear movement mechanism that selectively moves the pawl release structure into engagement with the pawl structure causing disengagement of the pawl structure from the ratchet tooth structure, and that selectively moves the first and second tubes relative to each other.

5. The height adjustable seatpost assembly according to claim 4, wherein the linear movement mechanism is arranged with respect to the pawl release structure and first and second tubes such that the linear movement mechanism moves the pawl release structure into engagement with the pawl structure to disengage the pawl structure from the ratchet tooth structure prior to moving the first and second tubes relative to each other in response to operation of the drive source.

6. The height adjustable seatpost assembly according to claim 1, wherein
the pawl structure of the ratchet mechanism includes a first stop pawl member movable between a first lock position and a first free position and a second stop pawl member movable between a second lock position and a second free position and
the ratchet tooth structure of the ratchet mechanism includes a set of first ratchet teeth and a set of second ratchet teeth, with the first stop pawl member being movably arranged from the first lock position to the first free position in response to a first drive operation of the drive source and the second stop pawl member being movably arranged from the second lock position to the second free position in response to a second drive operation of the drive source.

7. The height adjustable seatpost assembly according to claim 6, wherein
the drive source further includes a pawl release structure having a first cam portion and a second cam portion, the first cam portion being movably arranged such that engagement of the first cam portion with the first stop pawl member causes disengagement of the first stop pawl member from the first ratchet teeth, and the second cam portion being movably arranged such that engagement of the second cam portion with the second stop pawl member causes disengagement of the second stop pawl member from the second ratchet teeth.

8. The height adjustable seatpost assembly according to claim 7, wherein
the drive source moves the pawl release structure in a first axial direction of the first and second tubes to disengage the first stop pawl member from the first ratchet teeth, and moves the pawl release structure in a second axial direction of the first and second tubes, which is different from the first axial direction, to disengage the second stop pawl member from the second ratchet teeth.

9. The height adjustable seatpost assembly according to claim 1, wherein
the drive source includes an electric motor.

10. The height adjustable seatpost assembly according to claim 1, wherein
the first tube is disposed inside the second tube with the pawl structure mounted to the first tube and the ratchet tooth structure mounted to an interior surface of the second tube.

11. The height adjustable seatpost assembly according to claim 2, wherein
the drive source further includes an elastic structure that is operatively disposed between the screw nut and the pawl structure to provide a prescribed range of relative axial movement of the pawl structure relative to the screw nut.

12. The height adjustable seatpost assembly according to claim 1, wherein
the drive source further includes a linear movement mechanism with a saver mechanism having a force transmitting state and a force override state,
the linear movement mechanism selectively moves the first tube relative to the second tube in a first axial direction that decreases an overall effective length of the height adjustable seatpost while the saver mechanism is in the force transmitting state,
the linear movement mechanism selectively moves the first tube relative to the second tube in a second axial direction that is opposite the first axial direction to increase the overall effective length of the height adjustable seatpost while the saver mechanism is in the force transmitting state, and
the saver mechanism provides a prescribed range of movement of the first tube in the first axial direction while the saver mechanism is in the force override state.

13. The height adjustable seatpost assembly according to claim 12, wherein
the ratchet tooth structure includes a plurality of ratchet teeth with each of the ratchet teeth have a pawl abutment that selectively engages the pawl structure in the lock position to prevent axial retraction of the first and second tubes,
the saver mechanism has a prescribed axial stroke that is larger than an axial distance between axially adjacent ones of the pawl abutments.

14. The height adjustable seatpost assembly according to claim 1, further comprising
a controller operatively connected to the drive source with the controller having a plurality of different preset seat position settings that selectively operate the drive source to move the first and second tubes relative to each other.

15. The height adjustable seatpost assembly according to claim 1, further comprising
a rotation detecting device that detects a rotation of the drive source when a controller operates the drive source.

16. The height adjustable seatpost assembly according to claim 6, wherein
the first and second stop pawl members pivot on separate axes between their respective lock positions and free positions.

17. The height adjustable seatpost assembly according to claim 6, wherein
the first and second stop pawl members pivot in a same pivotal direction to move from their respective lock positions to their respective free positions.

* * * * *